(12) United States Patent
Sugiyama

(10) Patent No.: US 6,442,274 B1
(45) Date of Patent: Aug. 27, 2002

(54) METHOD AND APPARATUS OF CANCELING ECHOES IN MULTI-CHANNEL

(75) Inventor: Akihiko Sugiyama, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/391,307

(22) Filed: Sep. 7, 1999

(30) Foreign Application Priority Data

Dec. 28, 1998 (JP) .......................................... 10-374831

(51) Int. Cl.⁷ .............................................. H04M 9/08
(52) U.S. Cl. ............................. 379/406.08; 379/406.01; 379/406.06; 379/406.09; 379/406.03; 379/406.04; 379/406.14
(58) Field of Search ................................. 379/402, 412

(56) References Cited

U.S. PATENT DOCUMENTS

| 4,507,747 A | * | 3/1985 | Houdard et al. ............ 379/406 |
| 5,323,459 A | * | 6/1994 | Hirano ....................... 379/391 |
| 5,371,789 A | * | 12/1994 | Hirano ....................... 379/410 |

OTHER PUBLICATIONS

Borrallo et al ; "On the Implementation of a Partitioned Block Frequency Domain Adaptive Filter (PBFDAF) for long Acoustic Echo Cancellation"; Int. J. of Signal Processing, vol. 27, No. 3. Jun. 1992; Pub: Elsevier, New York; pp. 301–315.*

Gitlin et al; Data Communications Principles; 1992, Pub. Plenum Press, New Your, Chapter 9, Section 9.3; pp. 619–623.*

Bernard Widrow, et al. "Adaptive Signal Processing" Prentice Hall, pp. 338–347.

Michael L. Honig, et al. "Adaptive Filters: Structures, Algorithms, and Applications" Kluwer Academic Publishers, pp. 54–57.

Akihiro Hirano, et al. "A Noise–Robust Stochastic Gradient Algorithm With an Adaptive Step–size Suitable For Mobile Hands–free Telephones" 1995, IEEE, pp. 1392–1395.

Yutaka Hiratani, et al. "A Noise–Robust Echo Canceller on V830 Multimedia Risc Processor Integrated into a Car Navigation System" 1998, IEEE, pp. 1753–1756.

V. John Mathews, et al. "Stochastic Gradient Adaptive Filters With Gradient Adaptive Step Sizes" 1990, IEEE, pp. 1385–1388.

Akihiko Sugiyama "An Interference–Robust Stochastic Gradient Algorithm With a Gradient–Adaptive Step–Size" Apr. 1993, IEEE International Conference on Acoustics, Speech and Signal Processing.

Akihiko Sugiyama "An Adaptive–Step LMS Algorithm With Coefficient Value Evaluation (Alcove)" 1991, A–75, C&C Systems Research Laboratories.

(List continued on next page.)

Primary Examiner—Forester W. Isen
Assistant Examiner—Ramnandan Singh
(74) Attorney, Agent, or Firm—Dickstein, Shapiro, Morin & Oshinsky, LLP.

(57) ABSTRACT

An echo canceling apparatus suitable for multiplexed transmission lines is provided that achieves a short convergence time and a small number of arithmetic operations. Adaptive filters are located in respective transmission lines. Each adaptive filter adaptively controls tap positions such that tap coefficients are located in dispersive regions which are obtained by removing fixed delays from the impulse response in an echo path. A controller receives tap position information from the adaptive filters to mutually compare the convergence degrees among the adaptive filters. Thus, the controller respectively supplies coefficient update control signals to the adaptive filters so as to suppress coefficient adaptation of an adaptive filter whose convergence is leading compared with the others.

15 Claims, 33 Drawing Sheets

OTHER PUBLICATIONS

Tyseer Aboulnasr, et al. "A Robust Variable Step–Size LMS–Type Algorithm: Analysis and Simulations" IEEE Transactions On Signal Processing, vol. 45, No. 3, Mar. 1997.

T. Creasy, et al. "A Robust Adaptive Filtering Algorithm For Acoustic Echo Cancellation" School of Information Technology & Engineering, University of Ottawa.

Kenji Muto, et al. "A Step Gain Modification for the Learning Identification Method Using Fuzzy Control" Journal of the Acoustics Society of Japan, vol. 53, No. 12, 1997, pp. 941–948.

Akihiko Sugiyama, et al. "Sparse–Tap Adaptive Fir Filter Algorithms Suitable For Speech Signals" NEC Corporation and Chuo University.

* cited by examiner

METHOD AND APPARATUS OF CANCELING ECHOES IN MULTI-CHANNEL

BACKGROUND OF THE INVENTION

The present invention relates to an echo canceling method or apparatus that can simultaneously cancel echoes occurring in plural transmission lines.

Regarding the techniques of canceling echoes leaking from the transmitter side to the receiver side on the 4-line side of a 2-4 wire hybrid transformer, an echo canceler disclosed in "Adaptive Signal Processing", 1985. Practice-Hall Inc., USA (reference 1—see Appendix 1) is known.

An echo canceller uses an adaptive filter with tap coefficients equal to or exceeding the impulse response length of the echo path. The echo canceller generates a pseudo echo (echo replica) corresponding to the transmitted signal and then suppresses the echo leaking from the transmitter side to the receiver side in the 2-4 wire hybrid transformer. Each tap coefficient of the adaptive filter can be adapted by taking the correlation between the transmitted signal and an error obtained by subtracting the echo replica from a mixed signal containing the echo and the received signal.

As a typical coefficient adaptation algorithm for the adaptive filters, the normalized LMS (NLMS) disclosed in "Adaptive Filters", 1985, Kulwer Academic Publications, USA (reference 2—see Appendix 2) is known.

In actual communication lines, plural subscriber lines are multiplexed to further improve the communication capacity for efficiency. In a such case, echo cancellers that remove echoes in the 2-4 wire hybrid transformer are provided corresponding to the number of lines to be multiplexed.

FIG. 31 shows a configuration of a prior art of multiplexed echo cancellers where the number of multiplex is three. In the first channel, a transmission signal is input to the transmission signal input terminal 1 and then is transmitted to the transmission line via the transmission signal output terminal 2. The transmission signal is further transmitted to the 2-line side of the 2-4 wire hybrid transformer 3. However, the mismatch in impedance causes a part of the transmission signal to leak as an echo into the receiving side. The echo is supplied to the subtracter 5 via the received signal input terminal 4. The adaptive filter 86 receives the input signal 700 input to the input terminal 1 and then performs the convolution of the input signal with a corrected coefficient value of the adaptive filter 86 based on the error signal 702 which is the output of the subtracter 5, thus, creating an echo replica 701. The subtracter 5 subtracts the echo replica 701 given by the adaptive filter 86 from the echo leaking into the receiver side and then transmits the subtracted result to the received signal output terminal 6. The subtracted result is further fed back to the adaptive filter 86 as the error signal 702 for coefficient updating. FIG. 32 is a block circuit diagram illustrating a configuration of the adaptive filter 86. The adaptive filter 86 has (N–1) delay elements including the delay elements $20_I$ to $20_{N-1}$ each of which delays the transmission signal 700. The number of taps, including the tap with a delay of zero, is N. The adaptive filter 86 further has N coefficient generators $310_I$ to $310_N$ to generate tap coefficients thereof. N delayed samples, or outputs of the delay elements, are supplied to the corresponding coefficient generators $310_I$ to $310_N$ and the multipliers $40_I$ to $40_N$.

The multipliers $40_I$ to $40_N$ respectively multiply tap coefficients output from the coefficient generators $310_I$ to $310_N$ by delayed samples from corresponding delay elements and then outputs the results to the adder 8. The adder 8 adds all the results from the multipliers $40_I$ to $40_N$ and then outputs the sum as the echo replica 701. The memory 105 supplies a step size used for coefficient adaptation to with the coefficient generators $310_I$ to $310_N$.

The coefficient generator $310_i$ (i=1, 2, . . . , N) has the configuration shown in FIG. 33. The multiplier 31 multiplies the error 702 by a step size. The multiplier 32 multiplies the resultant product by a delayed signal from each of the delay elements $20_I$ to $20_{N-1}$. The output of the multiplier 32 represents a coefficient correction amount. The adder 33 adds the output of the multiplier 32 and a coefficient value stored in the memory 34 and then feeds back the resultant sum to the memory 34. The value delayed by the memory 34 becomes the coefficient value after updating.

The configuration of echo cancellers in the second and third channels shown in FIG. 31 is similar to that in the first channel. The operation of each element is similar to that in the first channel. Hence, the duplicate description will be omitted here.

The conventional echo canceller for multiplexed lines requires computations which increase in proportion to the number of multiplexed lines. This results from the fact that the characteristics of signals input to the multiplexed line are not considered.

SUMMARY OF THE INVENTION

The present invention is made to solve the above-mentioned problems.

The objective of the invention is to provide an echo canceling method suitable for multiplexed lines, which requires a small amount of computations.

Furthermore, the objective of the present invention is to provide an echo canceling apparatus suitable for multiplexed lines, which requires a small amount of computations.

The echo canceling method or apparatus for multiplexed lines of the present invention is characterized in that the convergence degrees of adaptive filters in plural channels are mutually compared and the coefficient updating of adaptive filters whose convergence is leading is suppressed.

Specifically, the echo canceling apparatus has a controller-that evaluates a set of information regarding time-varying step sizes received from adaptive filters respectively connected to transmission lines,. thus, respectively supplying coefficient update suppression signals to the adaptive filters.

Moreover, the echo canceling apparatus has a controller that receives a set of information regarding tap coefficient positions, in the area of the tapped delay line where tap coefficients are most concentrated, from adaptive filters respectively connected to transmission lines, and evaluates variations of the information, thus, supplying coefficient update suppression signals to the respective adaptive filters.

BRIEF DESCRIPTION OF THE INVENTION

This and other objects, features, and advantages of the present invention will become more apparent upon reading of the following detailed description and drawings, in which.

DESCRIPTION OF THE EMBODIMENTS

Preferred embodiments of the present invention will be described below with reference to the attached drawings.

Figure 1:
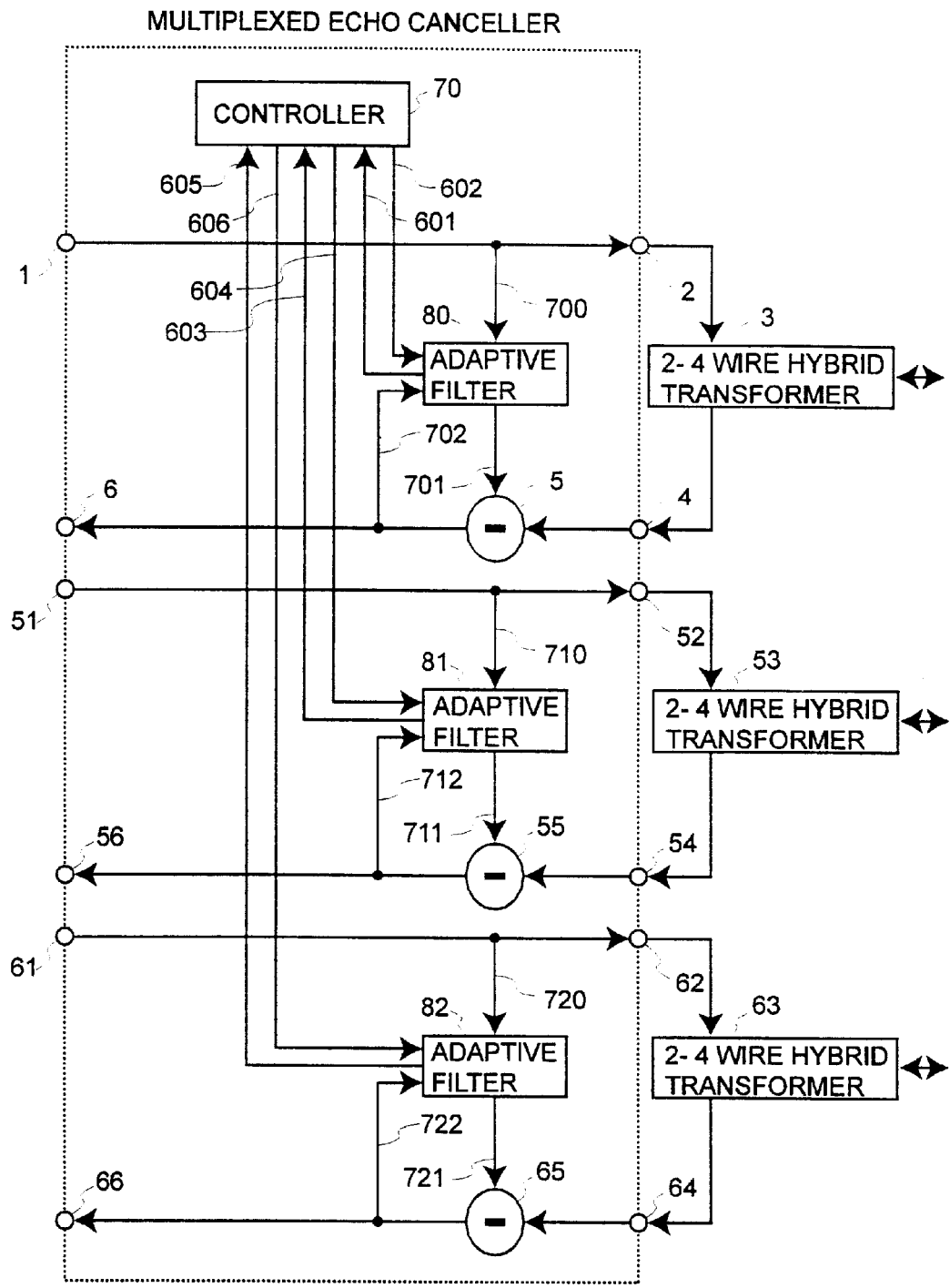
FIG. 1 is a block diagram illustrating an echo canceling apparatus according to a first embodiment of the present invention.
Figure 31:
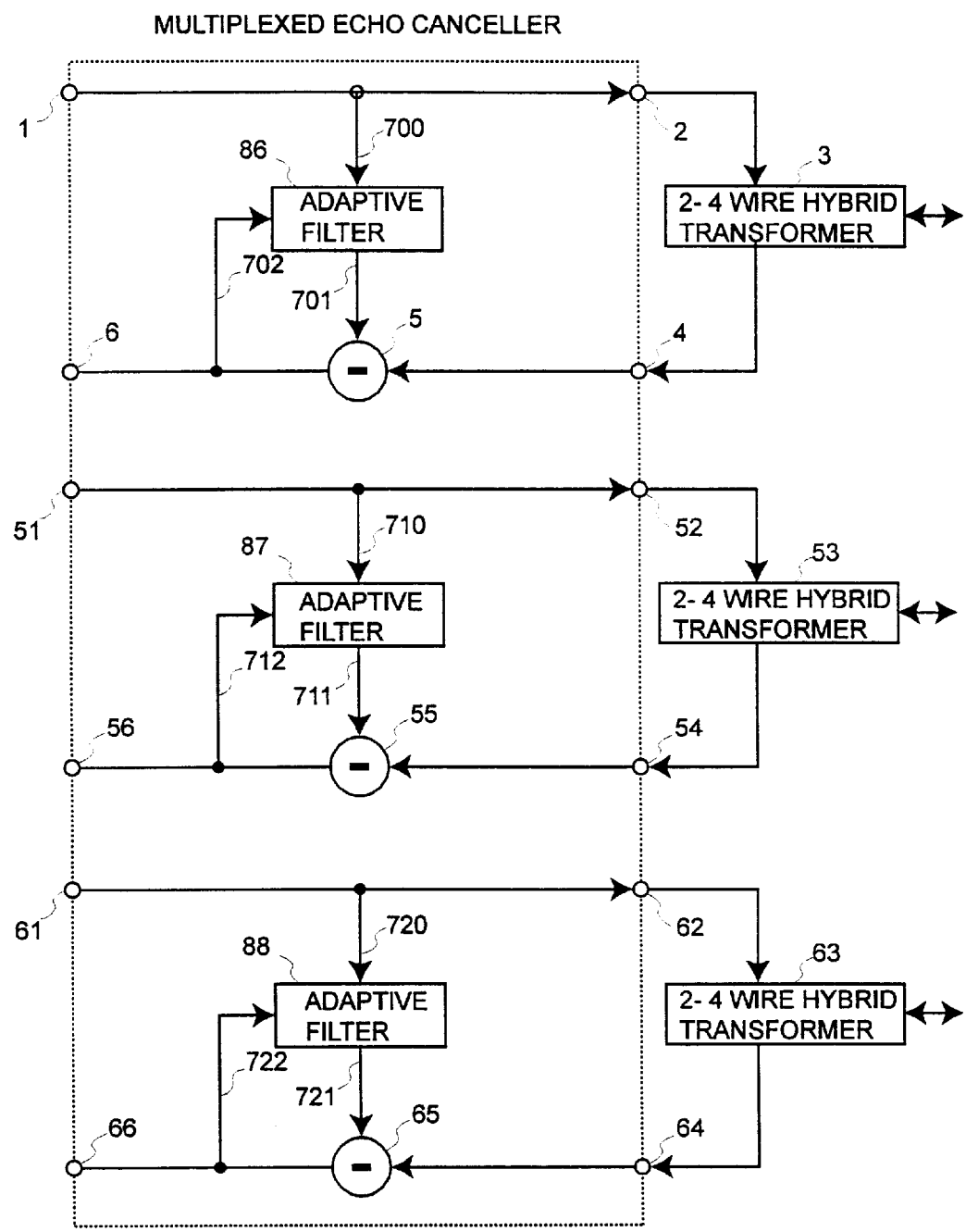
FIG. 31 is a block diagram illustrating the configuration of a conventional echo canceller.

FIG. 1 illustrates the configuration of an echo canceling apparatus according to a first embodiment of the present invention. This configuration is similar to the conventional configuration of FIG. 31, except the controller 71 and adaptive filters 80, 81 and 82. Here, the embodiment will be described in detail in connection with the difference and operation.

The controller 70 evaluates the step size 601 from the adaptive filter 80, the step size 603 from the adaptive filter 81, and the step size 605 from the adaptive filter 82. Each of the adaptive filters 80, 81 and 82 adaptively controls the step size to improve the noise resistants or to reduce the convergence time. Now, it is assumed that, at the time k, the step sizes 601, 603 and 605 are $\mu_1(k)$, $\mu_2(k)$ and $\mu_3(k)$, respectively.

The controller 70 first averages the step sizes to find average step sizes $\mu_1$ bar (k), $\mu_2$ bar (k) and $\mu_3$ bar (k). There are some averaging methods. For instance, an averaging method using a first-order leaky integration is expressed by:

$$\bar{\mu}_1(k+1) = \gamma \bar{\mu}_1(k) + (1-\gamma)\mu_1(k) \tag{1}$$

and that using moving average is expressed by:

$$\bar{\mu}_1(k+1) = \frac{1}{N_A} \sum_{j=k-N_A+2}^{k+1} \mu_1(j) \tag{2}$$

where γ is a constant satisfying 0<γ<1 and $N_A$ is the window length for moving average. These averaging methods are applicable to $\mu_2$ bar (k) and $\mu_3$ bar (k). Next, convergence indexes $\Delta\mu_1(k)$, $\Delta\mu_2(k)$ and $\Delta\mu_3(k)$ are computed for the average step sizes. The convergence index is obtained by, for instance, the following equation:

$$\Delta\mu_1(k) = \frac{|\bar{\mu}_1(k) - \bar{\mu}_1(k-1)|}{\bar{\mu}_1(k)} \quad (3)$$

This equation (3) gives a variation of $\mu_1$ bar (k) per unit time. Similarly, $\Delta\mu_2$ (k) and $\Delta\mu_3$ (k) can be obtained using the equation (3).

Since $\Delta\mu$ (k) for each adaptive filter decreases corresponding to the convergence of coefficients, an adaptive filter with a small $\Delta\mu$ (k) is in a more advanced convergence state. This means that the priority for coefficient updating can be decreased. Under this principle, the necessities of coefficient updating of adaptive filters are respectively managed by the counters Γ1(k), Γ2(k) and Γ3(k).

First, the convergence indexes $\Delta\mu_1$ (k), $\Delta\mu_2$ (k) and $\Delta\mu_3$ (k) are compared with a predetermined threshold. Only the convergence indexes larger than the threshold can increment the counters $\Gamma_1((k), \Gamma_2(k)$ or $\Gamma_3(k)$. All counters are first reset to an initial value (zero) to operate the adaptive filters. Only when $\Delta\mu_1$ (k), $\Delta\mu_2$ (k) or $\Delta\mu_3$ (k) is larger than the threshold, the corresponding counter is increased by 1. For instance, when $\Delta\mu_1$ (k) and $\Delta\mu_2$ (k) are larger than the threshold, the following operations are carried out:

$$\Gamma_1(k+1) = \Gamma_1(k) + 1 \quad (4)$$

$$\Gamma_2(k+1) = \Gamma_2(k) + 1 \quad (5)$$

$$\Gamma_3(k+1) = \Gamma_3(k) \quad (6)$$

The counters $\Gamma_1$ (k), $\Gamma_2$(k) and $\Gamma_3$ (k) are compared with each other. Only the coefficients of the adaptive filter which corresponds to the maximum count is updated. The counters corresponding to the adaptive filters with coefficient adaptation are decreased by 1. The counters $\Gamma_1$ (k), $\Gamma_2$(k) and $\Gamma_3$ (k) can be controlled based on the values obtained by averaging the convergence indexes $\Delta\mu_1$ (k), $\Delta\mu_2$ (k) and $\Delta\mu_3$ (k) corresponding to the equations (1) or (2), instead of $\Gamma\mu_1$ (k), $\Delta\mu_2$ (k) and $\Delta\mu_3$ (k). $\Delta\mu$ (k) may be obtained by directly using the step size $\mu$ (k), without averaging by the equation (1) or (2).

Γ (k) has a convex trajectory gradually increasing from zero to a maximum value and then gradually decreasing to zero. It is known that calls occur according to the Poisson distribution in each channel of a multiplexed communication line. That is, each adaptive filter starts its operation at a different time. This control allows the coefficients to be updated by selectively updating coefficients of the adaptive filter with the highest accumulative necessity for coefficient adaptation at the time. The required number of computations for coefficient adaptation does not change even for an increased number of adaptive filters.

When the total number of computations for coefficient adaptation available for all the adaptive filters is large, the coefficients of plural adaptive filters with large values of Γ1 (k), Γ1(k) or Γ3 (k) can be updated according to the available total number of computations. The controller 70 supplies coefficient update control signals 602, 604 and 606 to the adaptive filters 80, 81 and 82, respectively. Among the coefficient update control signals 602, 604 and 606, only one signal corresponding to the adaptive filter whose coefficients are updated is set to 1, however, all the other control signals are set to 0.

Figure 2:
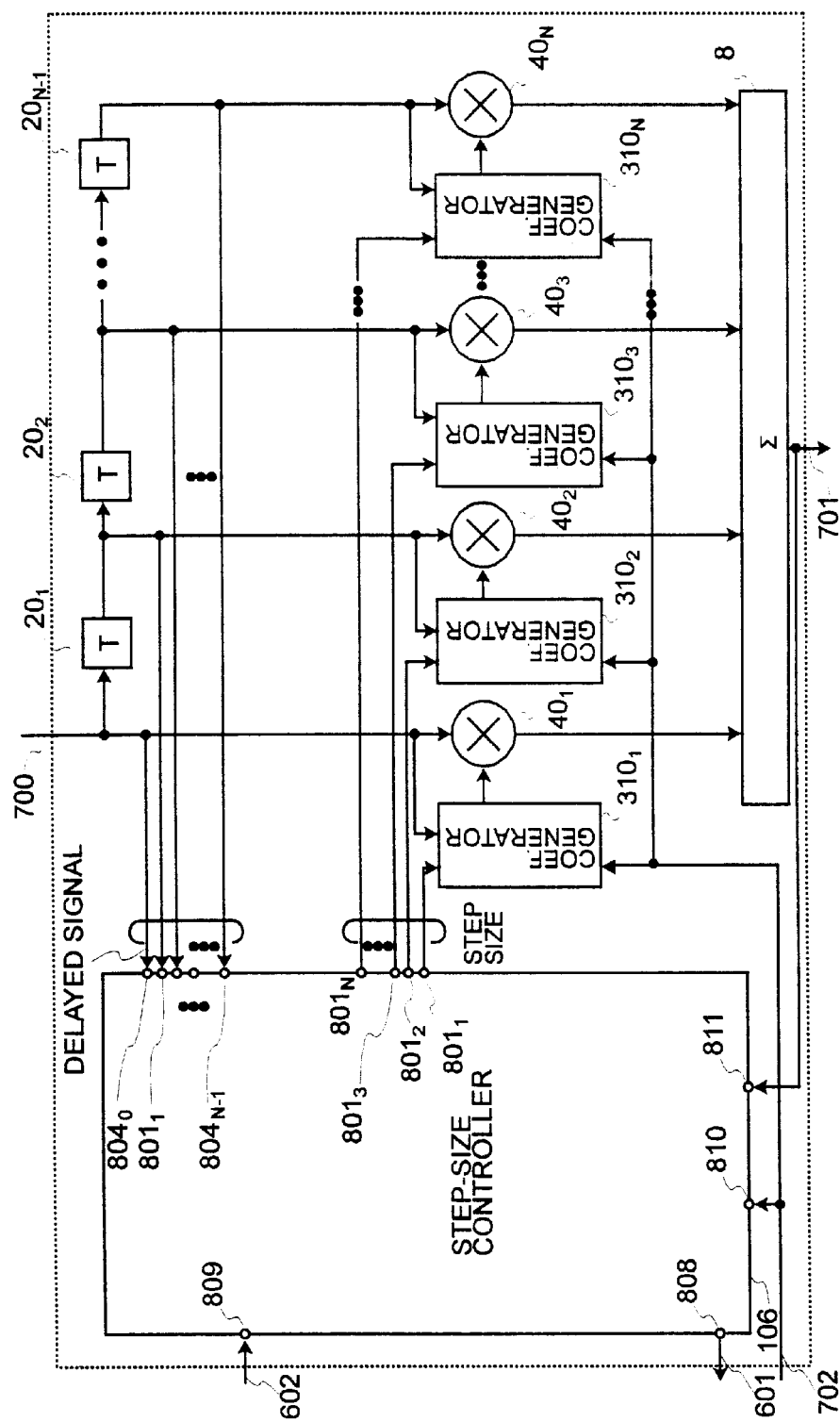
FIG. 2 is a block diagram illustrating the configuration of an adaptive filter according to the first embodiment of the present invention.
Figure 32:
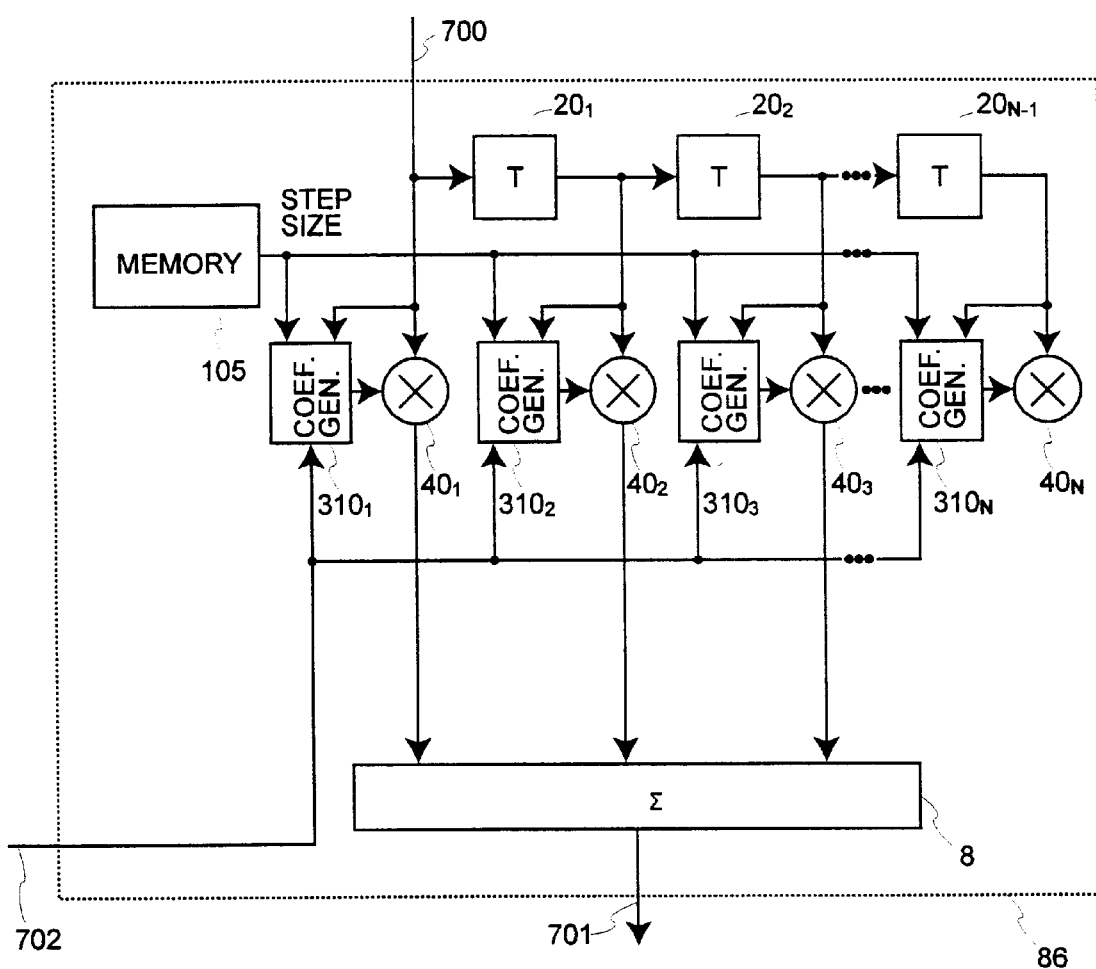
FIG. 32 is a block diagram illustrating the configuration of an adaptive filter in the conventional echo canceller.

FIG. 2 is a block diagram illustrating the configuration of the adaptive filter 80, 81 or 82. This configuration differs from that of FIG. 32 in that the step-size controller 106 is substituted for the memory 106 of FIG. 32. The step-size controller 106 recursively computes the step size to improve the noise resistance in the adaptive coefficient control. Here, the noise means signals added to the error 702 other than the difference between the echo and the echo replica. Referring to FIG. 1, noises added to the echo are input at the received signal input terminal 4. The noises may be of pure noise components such as thermal noises or voices of a talker received through the 2-4 wire hybrid transformer 3. Since such noise components are independent of the error 207, noises with large power may cause erroneous coefficient adaptation. To overcome such a problem, the step size is decreased when the power of noises is large.

A step size control method for improving noise is disclosed in IEEE PROCEEDINGS OF INTERNATIONAL CONFERENCE ON ACOUSTICS, SPEECH AND SIGNAL PROCESSING, Vol. II, pp. 1392–1395, May, 1995 (reference 3—see Appendix 3), and IEEE PROCEEDINGS OF INTERNATIONAL CONFERENCE ON ACOUSTICS, SPEECH AND SIGNAL PROCESSING, Vol. III, pp. 1753–1756, June, 1998 (reference 4—see Appendix 4).

In the methods of the references (3) and (4), the same step size is supplied to all the coefficient generators. The step size $\mu$ (k) at the time k is given by:

$$\mu(k) = \frac{\mu_0 P_X(k)}{P_X^2(k) + \alpha^2 P_N^2(k)} \quad (7)$$

$$P_N(k+1) = \beta P_N(k) + (1-\beta)e^2(k) \quad (8)$$

where e(k) is an error signal 702 and α, β and $\mu$0 are all constants. $P_x(x)$ is represented by:

$$P_x(k) = X(k)^T X(k) \quad (9)$$

where X(k) is a column vector having delayed signal samples supplied via the input terminals $804_o$ to $804_{N-1}$ as its events and $X_T(x)$ is a transpose of the vector X(k). According to the reference (3), when the power of the error 702 is larger than the power of the echo replica 701, $P_N(k)$ is updated. According to the reference (4), when $P_x(k)$ is smaller than a predetermined threshold, $P_N(k)$ is updated.

The step size controller 106 has the terminal 808 for outputting the step size 601 and the terminal 809 for receiving the coefficient update control signal 602. The step size obtained by computing the equation (7) is output as the step size 601 to the controller 70 via the terminal 808. The coefficient update control signal 602 received via the terminal 809 is multiplied by the step size obtained by computing the equation (7). The resultant product is supplied as a step size to the terminals $801_1$ to $801_N$. That is, when the coefficient update. control signal is 0, coefficient adaptation is skipped.

The operation and the configuration of the adaptive filter 80 has been described using the block diagram of FIG. 2. The configuration and operation of the adaptive filter 80 is identical to those of the adaptive filters 81 and 82 of FIG. 1. Moreover, although the number of adaptive filters in FIG. 1 was assumed to be 3, a similar description is applicable to the cases where the number of adaptive filters is 4 or more.

Figure 3:
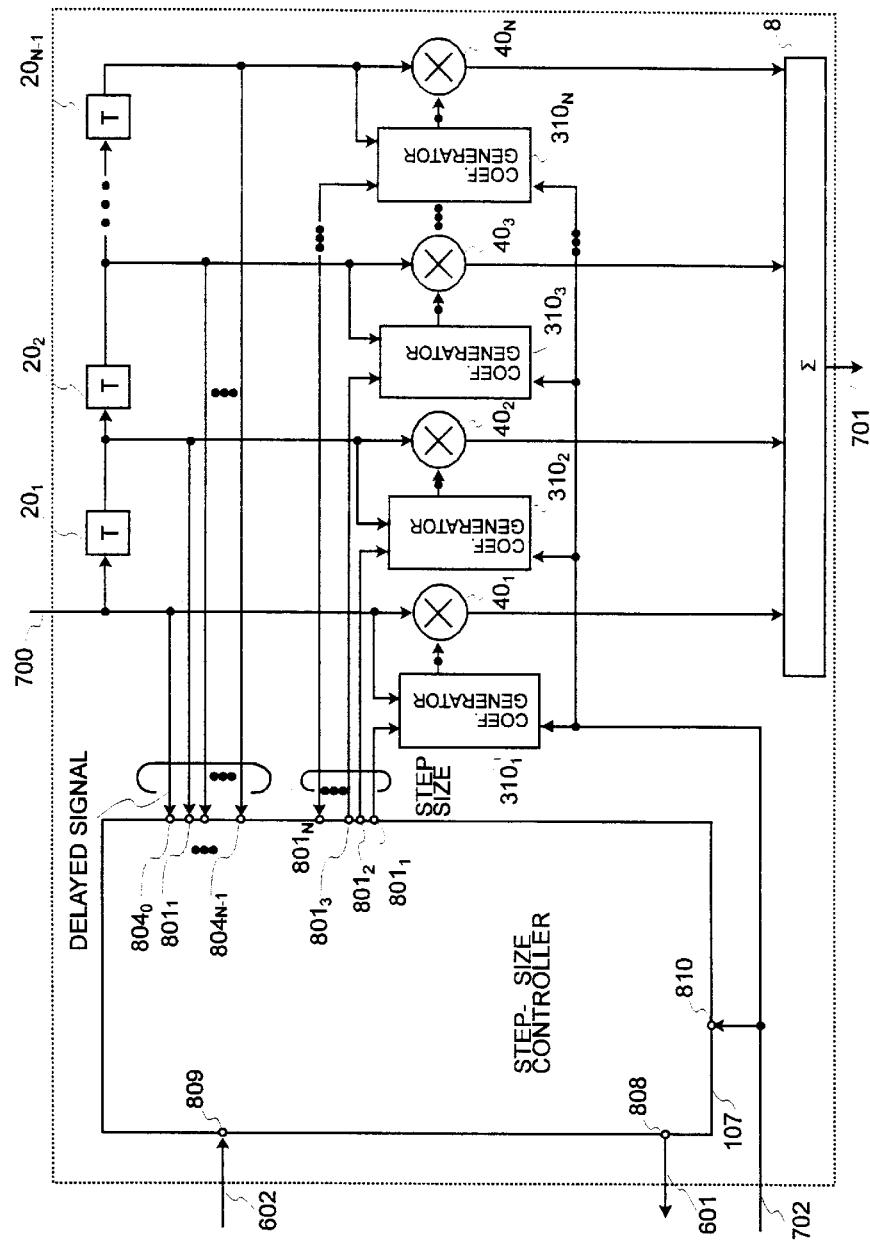
FIG. 3 is block diagram illustrating the configuration of an adaptive filter according to the second embodiment of the present invention.

FIG. 3 is a block circuit diagram illustrating the second configuration of each of the adaptive filters 81, 82 and 83, according to the second embodiment of the invention. The configuration of FIG. 3 differs from the first configuration of FIG. 2 in that the step-size controller 107 is substituted for the step-size controller 106. The step-size controller 107 differs from the step-size controller 106 in that there is not the terminal 811 for receiving the output from the adder 8. This is because the step-size computing method and the purpose differ from those of the step-size controller 106.

The step-size control by the step-size controller 106 is implemented to improve the noise resistance in the adaptive coefficient control. However, the step-size controller 107 recursively computes the step size to shorten the convergence time of the adaptive filter coefficients. An example of the step-size control method for achieving the above purpose is described in IEEE PROCEEDINGS OF INTERNATIONAL CONFERENCE ON ACOUSTICS, SPEECH AND SIGNAL PROCESSING, Vol. III, pp. 1385–1388, February, 1990 (reference 5—see Appendix 5).

According to the method in the reference 5, a common step size is supplied with all coefficient generators. The value $\mu(k)$ at the time k is given by:

$$\mu(k)=\mu(k-1)+\rho e(k)e(k-1)X(k-1)^{T}X(k) \tag{10}$$

where $\rho$ is a positive constant and e(k) is the error 702 input to the input terminal 810. The components of the vector X(k) are supplied as delayed signal samples to the input terminals $804_o$ to $804_{N-1}$.

The step size computed by the equation (10) is output as the step size 601 to the controller 70 (FIG. 1) via the terminal 808. The coefficient update control signal 602 received via the terminal 809 is multiplied by the step size obtained by computing the equation (10). The resulting product is supplied as a step size to the terminals $801_I$ to $801_N$. That is, when the coefficient update control signal 602 is 0, the coefficient adaptation is skipped.

An algorithm similar to that in the reference 5 is described in IEEE PROCEEDINGS OF INTERNATIONAL CONFERENCE ON ACOUSTICS, SPEECH AND SIGNAL PROCESSING, Vol. III, pp. 539–542, April, 1993 (reference 6—see Appendix 6). This algorithm is identical to the algorithm of the reference 5, except the non-linear operation applied to determine the step size, and can be simply realized by merely changing the operations in the step-size controller 106.

Figure 4:
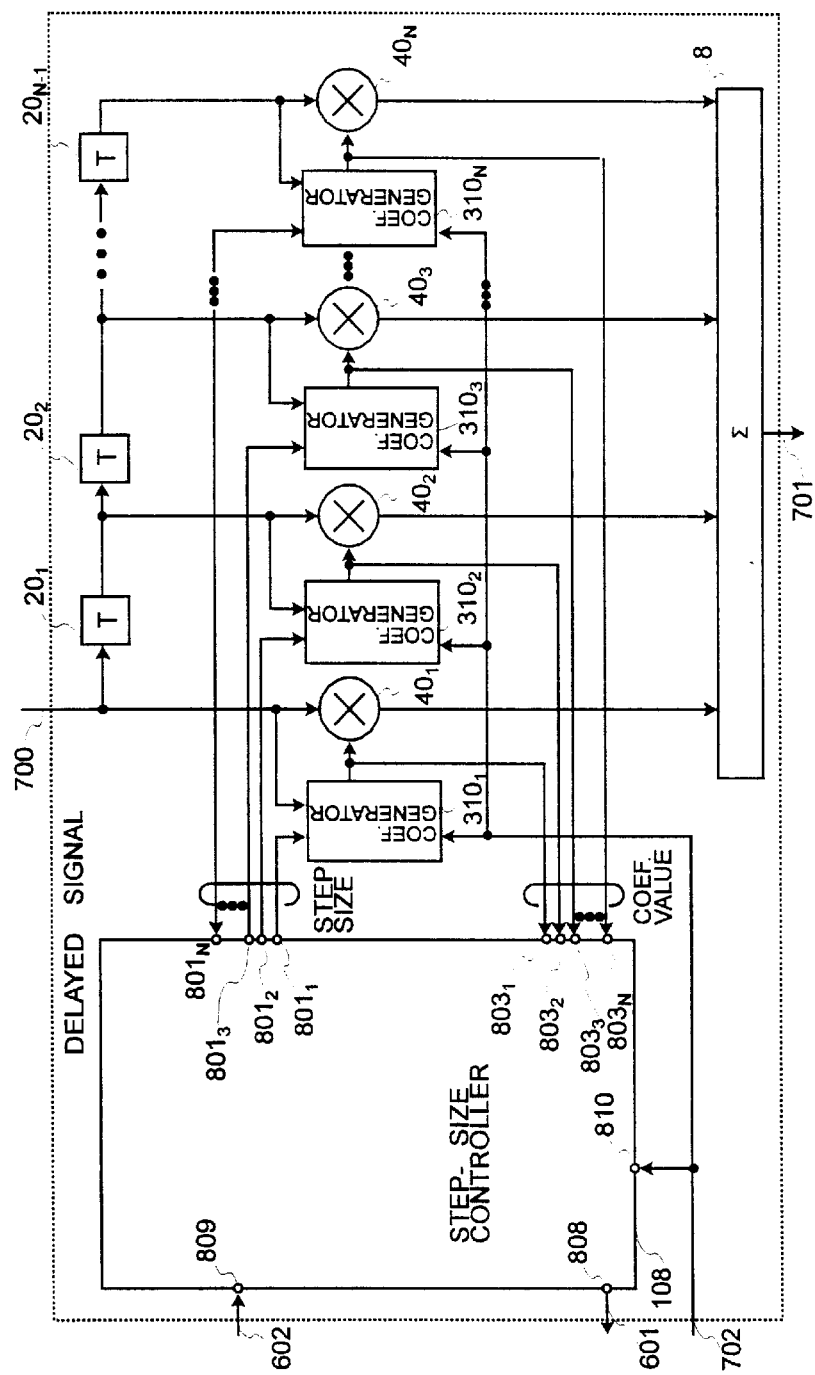
FIG. 4 is a block diagram illustrating the configuration of an adaptive filter according to the third embodiment of the present invention.

FIG. 4 is a block circuit diagram illustrating the third configuration of each of the adaptive filters 80, 81 and 83, according to the third embodiment of the invention. The configuration of FIG. 4 differs from that of FIG. 2 in that the step-size controller 108 is substituted for the step-size controller 107. The step-size controller 108 differs from the step-size controller 107 in that there are the input terminals $803_1$ to $803_N$ to receive coefficients from coefficient generators. This is because the step-size computing method differs from that in the step-size controller 107.

The step-size computing method in the step-size controller 108 is disclosed in the proceedings of Fall National Convention of the Institute of Electronics, Information and Communication Engineers of Japan, Vol. 1, September, 1991, p. 1–75 (reference 7—see Appendix 7). According to this method, a common step size is supplied to all coefficient generators. The value $\mu$ (k) at the time K is given by:

$$\mu(k) = \delta \cdot \frac{STA\left[\sum_{j=0}^{N-1} c_j^2\right]}{LTA\left[\sum_{j=0}^{N-1} c_j^2\right]} \tag{11}$$

where $\delta$ is a positive constant, $c_j$ is each of coefficients supplied from coefficient generators via the corresponding input terminals $803_I$ to $803_N$, STA[●] is a short-time average of the arguments for a short-time, and LTA[●] is a long-time average of the arguments. These averages can be computed in a similar manner to those of the equations (1) and (2).

The step size computed by the equation (11) is output as the step size 601 to the controller 70 (FIG. 1) via the terminal 808. The coefficient update control signal 602 received via the terminal 809 is multiplied by the step size obtained by computing the equation (11). The resulting product is supplied as a step size to the terminals $801_I$ to $801_N$. That is, when the coefficient update control signal is 0, the coefficient adaptation is skipped.

Various step-size controllers have been described with reference to FIGS. 2 to 4. However, other types of controllers may be applied in a similar manner. For example, other time-varying step-size controllers are disclosed in IEEE TRANSACTIONS ON SIGNAL PROCESSING, Vol. 45, No. 3, pp. 631–639, March, 1997 (reference 8—see Appendix 8), IEEE TRANSACTIONS OF DIGITAL SIGNAL PROCESSING WORKSHOP, pp. #82, August, 1998 (reference 9—see Appendix 9), and the Journal of Acoustical Society of Japan, Vol. 53, No. 12, pp. 941–948, December, 1997 (reference 10—see Appendix 10).

In the above descriptions, the adaptive filter is of a conventional transversal type. However, it is known that echo cancellers applied to satellite links can be more effectively realized using adaptive filters which have a smaller number of coefficient generators than delay elements and dynamically controls connections between delay elements and coefficient generators. An embodiment employing such adaptive filters will be described below.

Figure 5:
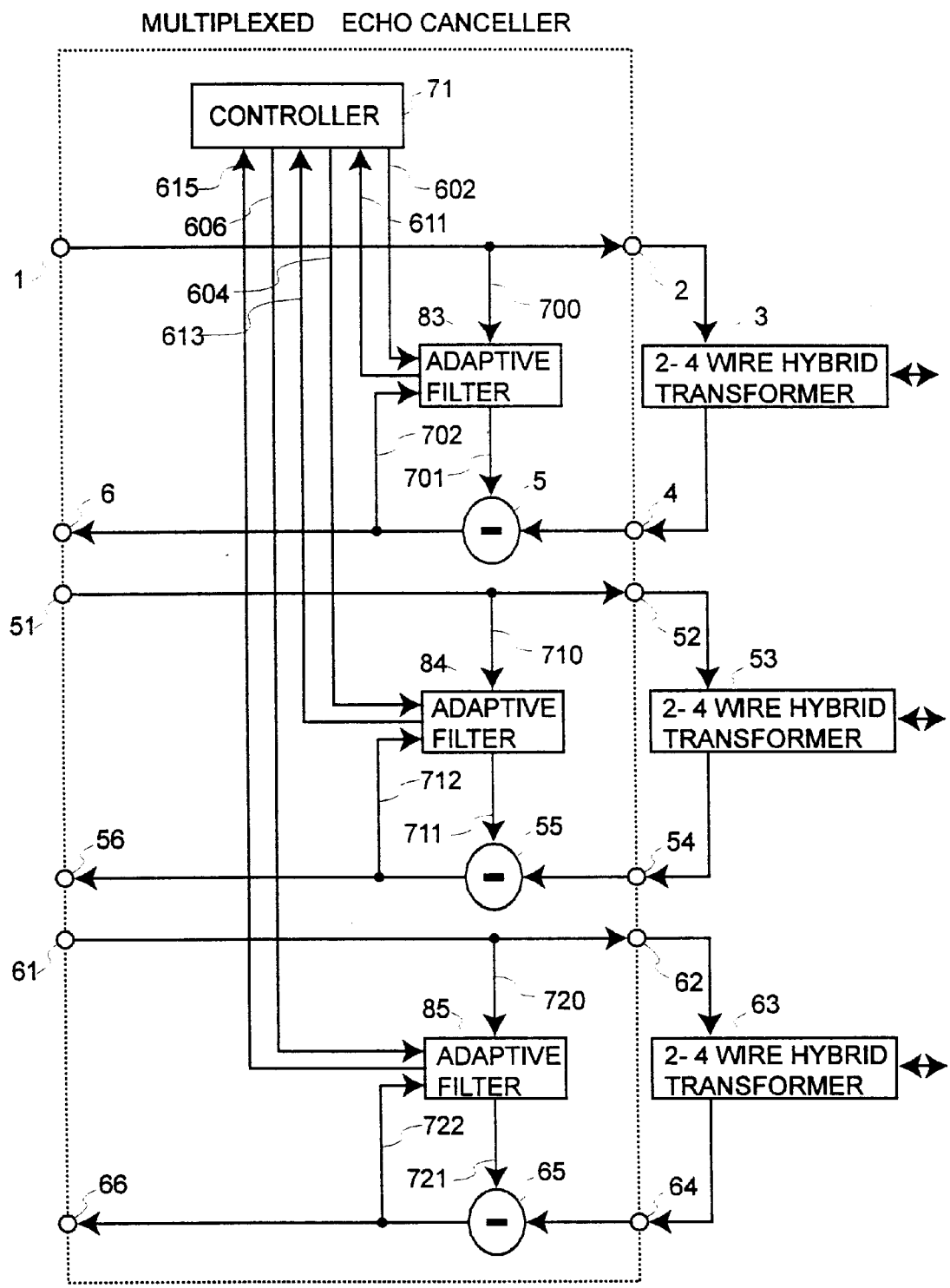
FIG. 5 is a block diagram illustrating an echo canceling apparatus according to a fourth embodiment of the present invention.

FIG. 5 is a block diagram illustrating an echo canceler according to the fourth embodiment of the invention. This embodiment differs from that of FIG. 1 in that the adaptive filters 83, 84 and 85 are substituted for the adaptive filters 80, 81 and 82 and the controller 71 is substituted for the controller 70. Each of the adaptive filters 83, 84 and 85 is of an adaptive filter which adaptively controls the tap position. The controller 71 evaluates a set of tap position information 611, 613 and 615 respectively output from the adaptive filters 83, 84 and 85, instead of the step sizes 601, 603 and 605.

It is now assumed that a set of tap positions information at the time k are $\lambda_1(k)$, $\lambda_2(k)$ and $\lambda_3(k)$ respectively. The controller 71 first averages the set of information to obtain a set of averaged tap position information $\lambda_1\mathrm{bar}(k)$, $\lambda_2\mathrm{bar}(k)$ and $\lambda_3\mathrm{bar}(k)$. In a similar manner to that by the equation (1) or (2), the averaging is carried out by the following equations (12) or (13):

$$\bar{\lambda}_1(k+1)=\gamma\bar{\lambda}_1(k)+(1-\gamma)\lambda_1(k) \tag{12}$$

or $$\bar{\lambda}_1(k+1) = \frac{1}{N_A} \sum_{j=k-N_A+2}^{k+1} \lambda_1(j) \tag{13}$$

Similarly, this procedure is applicable to $\lambda_2\mathrm{bar}(k)$ and $\zeta_3\mathrm{bar}(k)$. In succession, convergence indexes $\Delta\lambda_1(k)$, $\Delta\lambda_2(k)$ and $\Delta\lambda_3(k)$ are computed in terms of the set of averaged tap position information. The convergence index, for instance, can be obtained by:

$$\Delta\lambda_1(k) = \frac{|\overline{\lambda}_1(k) - \overline{\lambda}_1(k-1)|}{\overline{\lambda}_1(k)} \quad (14)$$

This index represents a variation per time of $\lambda_1$bar(k) per a unit time. Similarly, this procedure is applicable to $\Delta\lambda_2(k)$ and $\Delta\lambda_3(k)$.

$\Delta\lambda$ (k) for each adaptive filter decreases corresponding to the convergence of coefficients. Since an adaptive filter with a small coefficient index $\Delta\lambda$ (k) is in an advanced convergence state, the priority for coefficient adaptation can be lowered. The necessity for coefficient adaptation in each adaptive filter is managed based on the principle, using the counters $\Gamma_1(k)$, $\Gamma_2(k)$ and $\Gamma_3(k)$.

The management of the necessity coefficient adaptation in each adaptive filter using the counters $\Gamma_1(k)$, $\Gamma_2(k)$ and $\Gamma_3(k)$ is identical to that of the first embodiment of FIG. 1. Hence, a duplicate description will be omitted here. The description about the first embodiment is applicable to this case by substituting $\lambda$ for $\mu$ and "tap position information" for "step size." The coefficient update control signals 602, 604 and 606 supplied from the controller 71 to the adaptive filters 83, 84 and 85 are identical to coefficient update control signals from the controller 70.

Figure 6:
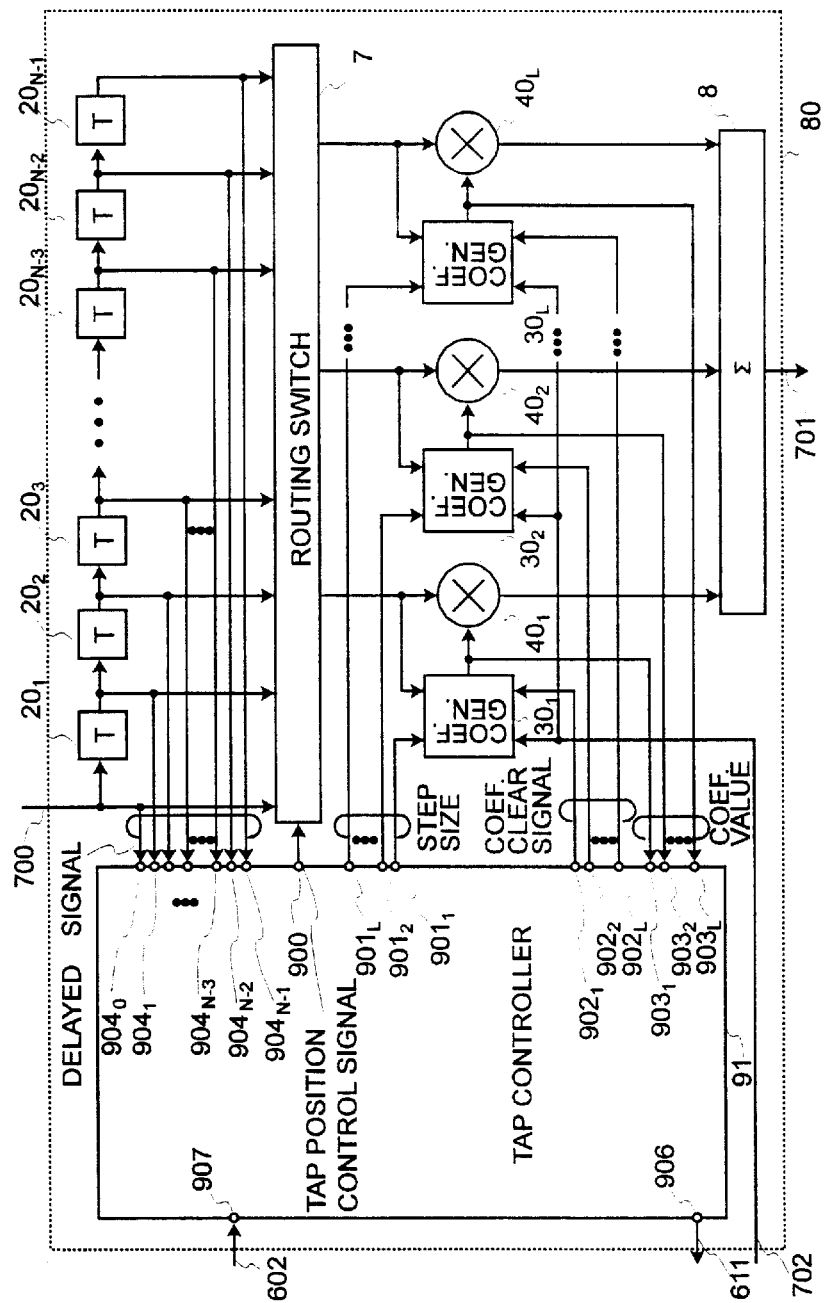
FIG. 6 is a block diagram illustrating the configuration of an adaptive filter according to the fourth embodiment of the present invention.

FIG. 6 is a block diagram illustrating the first configuration of each of the adaptive filters 83, 84 and 85 of FIG. 5. This configuration differs from the configurations of FIGS. 2 to 4 corresponding to the first to third configurations in that referring to FIG. 6, the positions of dispersive regions obtained by removing fixed delays from the impulse response of an echo path are estimated. The coefficient positions are adaptively controlled so as to arrange the tap coefficient of the adaptive filter in the vicinity of the estimated positions. Particularly, in order to shorten the convergence time, approximate positions of the dispersive regions are first estimated and then the tap coefficients are arranged near the estimated positions.

This method is similar to the method that disclosed in the Proceedings of the Digital Signal Processing Symposium of the Institute of Electronics, Information and Communication Engineers of Japan, November, 1997, pp. 543–458, (reference 11—see Appendix 11). However, the difference is that the tap controller 91 has the output terminal 906 for providing outside with the tap position information 611 and the input terminal 907 for receiving the coefficient update control signal 602. The configuration and operation of the adaptive filter 83 will be described below with reference to the attached drawings.

Referring FIG. 6, the adaptive filter has (N−1) delay elements including delay elements $20_1$ to $20_{N-1}$ each for delaying the input signal 700. The total number of taps including the tap with a delay of zero is N. In order to generate tap coefficients of the adaptive filter, the adaptive filter has L coefficient generators $30_1$ to $30_L$. The relationship between the total number N of taps of the adaptive filter and the number L of coefficient generators is N>L. Unlike the conventional adaptive FIR filter, the adaptive FIR filter of FIG. 6 has tap coefficients which are sufficient to substantially cover the dispersive regions except the fixed delays. The tap coefficients are adaptively located in the dispersive regions.

For that reason, the adaptive filter has the routing switch 7 that switches connections between the outputs of the delay elements and the coefficient generators. The tap controller 91 controls the routing switch 7. The routing switch 7 selectively transfers the outputs of L delay elements to the coefficient generators based on the tap position control signal from the output terminal 900 of the tap controller 91.

The L delayed samples, or the outputs from the routing switch 7, are supplied with the corresponding coefficient generators $30_1$ to $30_L$ and the corresponding multipliers $40_1$ to $40_L$. The multipliers $40_1$ to $40_L$ respectively multiply tap coefficients from the coefficient generators $30_1$ to $30_L$ by the delayed samples from the routing switch 7 and then supply the products to the adder 8. The adder 8 adds all the products from the multipliers $40_1$ to $40_L$ to output the sum as the echo replica 701.

The tap controller 91 outputs the step sizes to be used for coefficient updating by the coefficient generators $30_1$ to $30_L$, via the output terminals $901_1$ to $901_L$. The coefficient clear signal is supplied to the coefficient generators $30_1$ to $30_L$ via the output terminals $902_1$ to $902_L$ of the tap controller 91 to reset the coefficients to zero. The tap controller 91 receives coefficient values from the coefficient generators $30_1$ to $30_L$ via the output terminals $903_1$ to $903_L$ and then generates the tap position control signal, the step size and the coefficient clear signal.

If it is assumed that the LMS algorithm disclosed in the reference 1 is used as the coefficient update algorithm, the value $c_i$ (k+1) after the (k+1)-th adaptation of the i-th is given by:

$$c_i(k+1) = c_i(k) + \mu_i e(k) \times \chi(k-a(i)) \quad (15)$$

where $c_i$ (k) is the i-th coefficient after k-th adaptation, $\mu_i$ is the step size corresponding to the i-th coefficient, $e(k)$ is the residual echo, $x(k-a(i))$ is the input signal sample after $(k-a(i))$ adaptation, a(i) is a set of the numbers of delay elements selected by the routing switch 7 with L as the number of elements.

Figure 7:
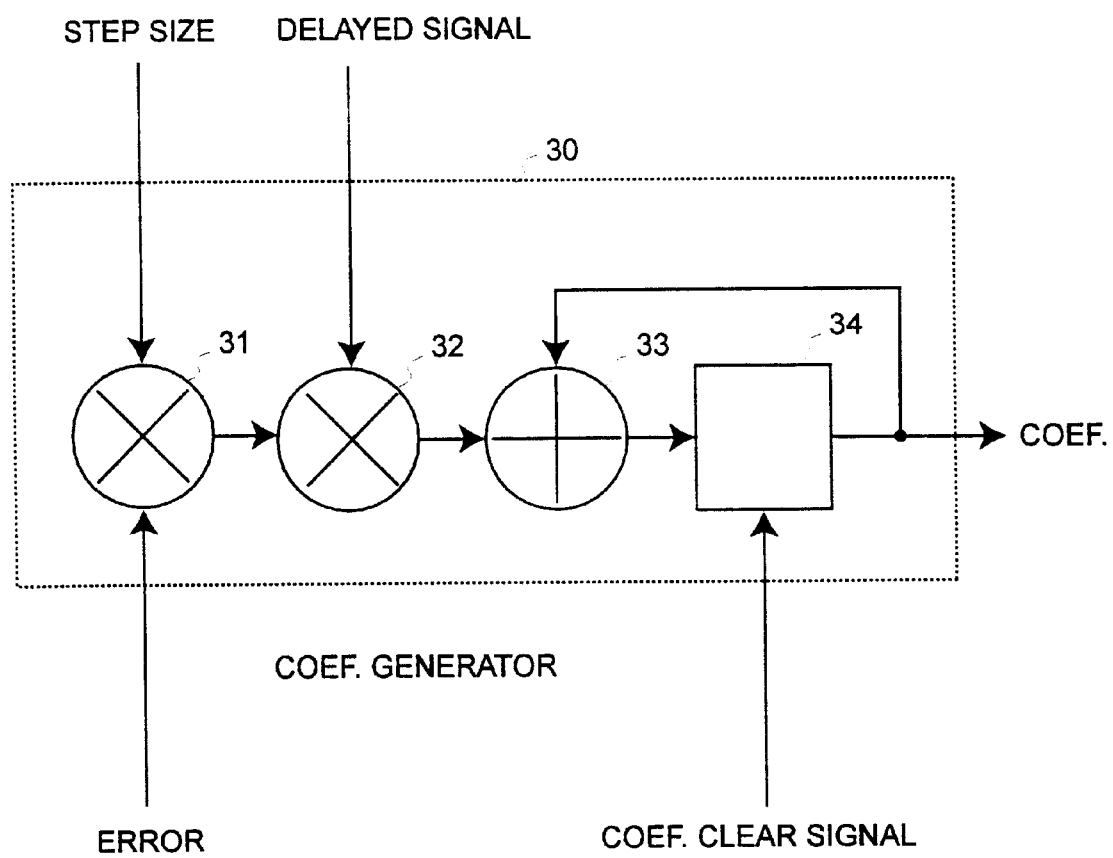
FIG. 7 is a block diagram illustrating the configuration of a coefficient generator in an adaptive filter according to the fourth embodiment of the present invention.
Figure 33:
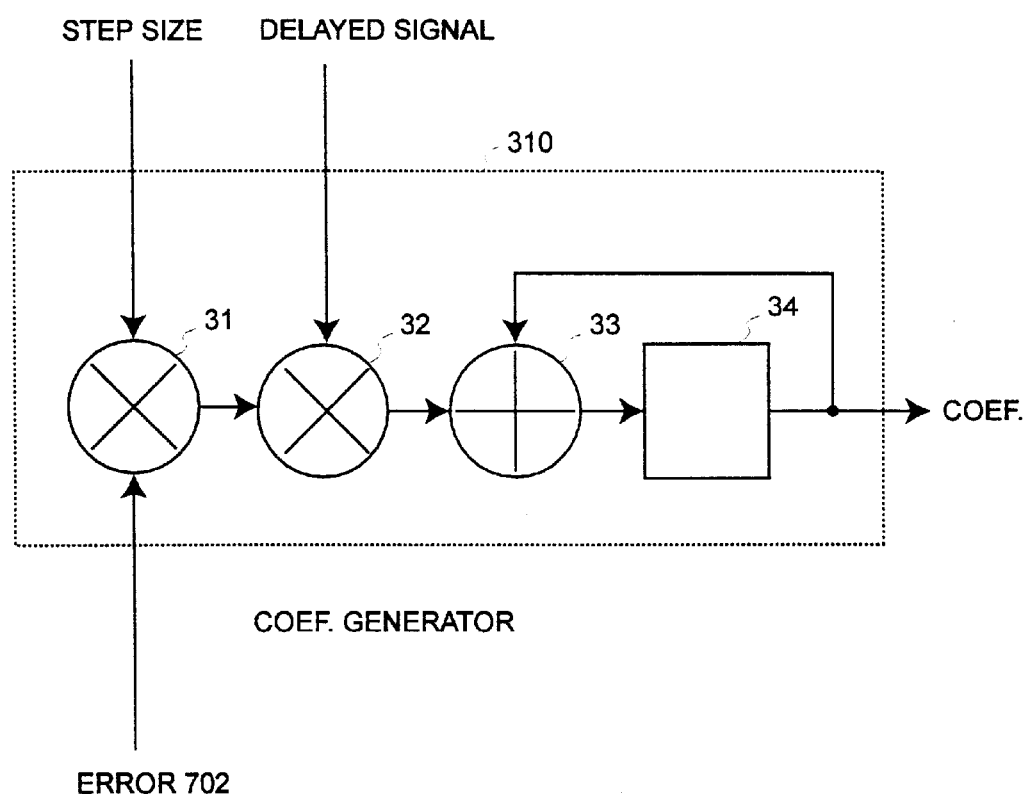
FIG. 33 is a block diagram illustrating the configuration of a coefficient generator of the adaptive filter in the conventional echo canceller.

The configuration of the coefficient generator $30_i$ (i=1, 2, ..., L) is represented as shown in FIG. 7. This configuration is basically identical to the coefficient generator $310_i$ shown in FIG. 33. However, the coefficient generator $30_i$ has a function to set the coefficients held in the memory 34 to zero in response to the coefficient clear signal from the tap controller 9 via the output terminal $902_i$ (i=1, 2, ..., L).

As clearly understood from the above description, the tap coefficients of the adaptive filter are supplied only with a part of the delay elements selected by the routing switch 7. The taps connected to a tap coefficient are referred to as active taps whereas those not connected to a tap coefficient are referred to as inactive taps. In the actual adaptive tap coefficient allocation, tap coefficients fewer than the total number of taps are initially distributed, for instance, with a constant interval. These taps become active taps. The taps to which coefficients are not assigned become inactive taps. The active taps may be initially located in the beginning of the tapped delay line or may be located randomly.

Figure 8:
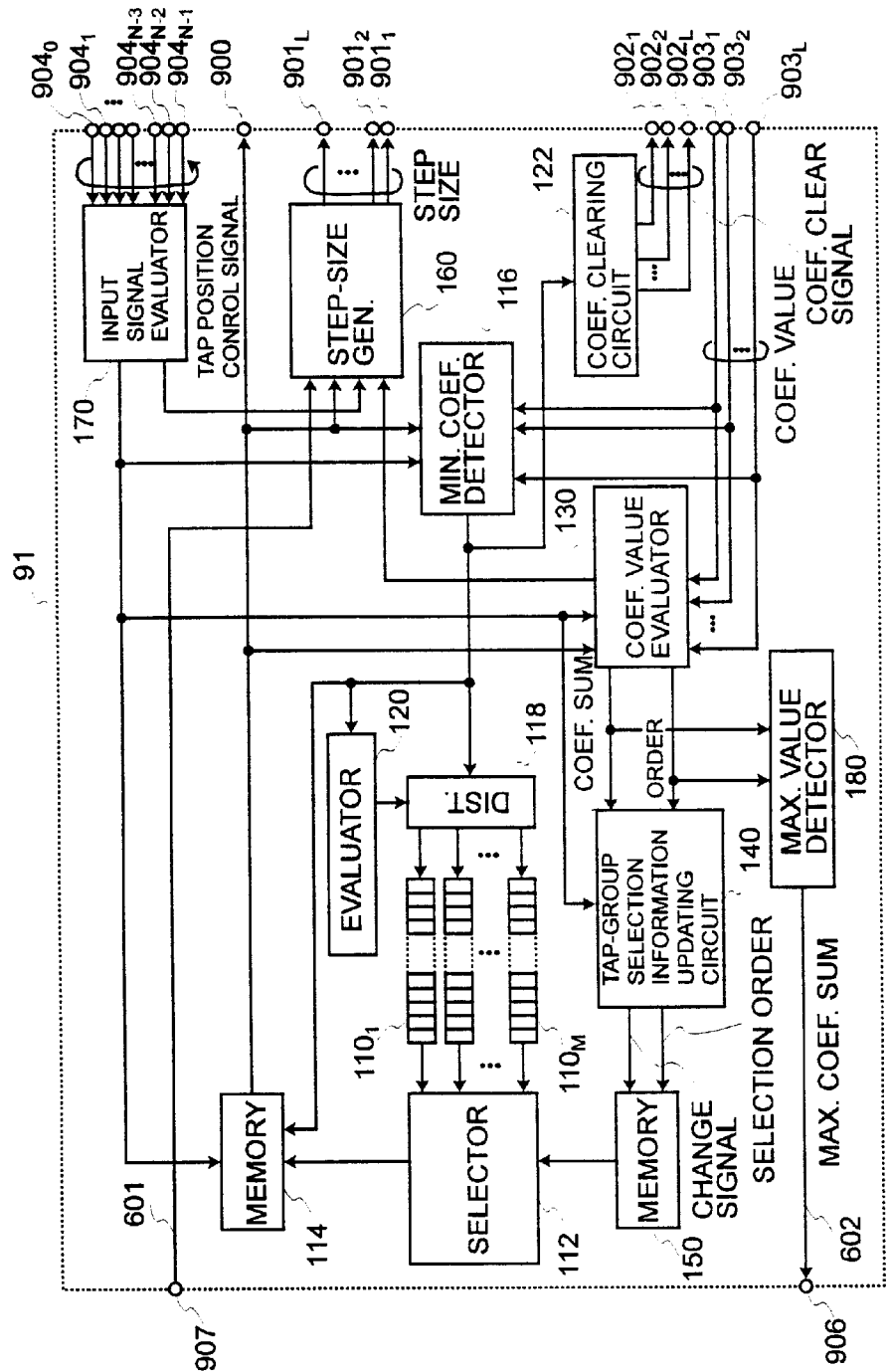
FIG. 8 is a block diagram illustrating the configuration of a tap controller in an adaptive filter according to the fourth embodiment of the present invention.

FIG. 8 is a block circuit diagram illustrating the configuration of the tap controller 91. A group of memories $110_1$, $110_2$, ..., $110_M$ has a FIFO (First-In-First-Out) configuration of a length of N/M and stores (N−L) inactive-tap numbers. Inactive taps numbers are divided into groups of (N/M) inactive tap obtained by equally dividing all taps into M groups and are stored in the memory. This group is called a tap group. For instance, when the number N of all taps is 20 and the number of tap groups is 5, the number N/M of taps belonging to each tap group is 4. Representing the tap group by G(n) (n=1, 2, ..., 5) and its elements by numbers in braces, G(n) are expressed by:

G(1)={1, 2, 3, 4}
G(2)={5, 6, 7, 8}
G(3)={9, 10, 11, 12}

G(4)={13, 14, 15, 16}
G(5)={17, 18, 19, 20}

Among these numbers, those currently defined inactive are stored in the corresponding memory. In the above example, G(n) (n=1, 2, . . . , 5) is stored in the memory $110_n$.

The selector 112 selects one of memory groups $110_1$, $110_2$, . . . $110_M$ according to the tap group selection signal supplied from the memory 150 every Q coefficient updating operations and then extracts the tap number stored at the top of the queue, thus transferring it as a new active tap number to the memory 114. The memory 114 stores L active-tap numbers which are not stored in the memory groups $110_1$, $110_2$, . . . , $110_m$ and supplies the output terminal 900 with active tap numbers as the tap position control signal.

The initial active tap numbers, or the initial values in the memory 114, may be tap numbers arranged in an arbitrary order. For instance, L numbers may be arranged in the increasing order or may be selected randomly. Let us now assume that the first L smallest tap numbers are selected as the active-1 tap numbers in the increasing order. In the foregoing case, tap numbers are 1, 2, 3, . . . , 20. For the number L of active taps=3 and the number (N−L) of inactive taps=17, three taps (1, 2, 3) are selected in the increasing order as the active tap number and thus, are stored as the initial values in the memory 114.

It is now assumed that the initial values to the memory groups $110_1$, $110_2$, . . . , $110_M$ are tap numbers other than the initial values set in the memory 114. In the above example, 4, 5, 6, . . . , 20 (except 1, 2, 3) are selected as the initial values and then are stored in corresponding memories of the memory groups $110_1$, $110_2$, . . . , $110_M$. After this initialization, the coefficients at active taps selected by the routing switch 7 are updated. Active taps are updated every time the coefficient updating is repeated Q times (Q is a positive integer) so that the coefficient arrangement is changed. Updating active taps is carried out by the following procedure.

In response to active-tap numbers from the memory 114 and the output of coefficient generators, or tap coefficient, supplied from the input terminals $903_1$ to $903_L$, the minimum coefficient detector 116 detects an active tap number corresponding to a coefficient with the minimum absolute value. The detected active-tap number is supplied to the memory 114, the distributor 118, the evaluator 120 and the coefficient clearing circuit 122.

The coefficient clearing circuit 122 produces a coefficient clear signal to the coefficient generator corresponding to the input tap number and then transfers it to the corresponding one of output terminals $902_1$, to $902_L$. The corresponding coefficient generator receives the coefficient clear signal to set the coefficient to zero. The evaluator 120 determines the tap group to which the tap number from the minimum coefficient detector 116 belongs and then transmits the corresponding tap group number to the distributor 118.

The distributor 118 selects the memory corresponding to the tap number supplied from the evaluator 120 among the memory groups $110_1$, $110_2$, . . . , $111_M$ and then transmits to it the tap number with the minimum coefficient sent from the minimum coefficient detector 116. The memory 114 erases the tap number from the minimum coefficient detector 116 and then stores a new tap number from the selector 112, thus, updating the stored active tap number.

The coefficient value evaluator 130 receives tap coefficient values output from coefficient generators and active tap numbers from the memory 114 and then computes the sum of absolute coefficient values for each tap group. M sums of the absolute coefficient values for each tap group are rearranged according to the magnitude. The corresponding tap group numbers are transmitted as ω "order" to the tap-group selection information updating circuit 140. The coefficient value evaluator 130 transmits the sums of absolute coefficients as a "coefficient sum" to the tap-group selection information updating circuit 140. The tap-group selection information updating circuit 140 computes the tap group selection order based on the set of information and then transmits it as "selection order" to the memory 150.

The memory 150 stores "selection order" output from the tap-group selection information updating circuit 140, or the tap group numbers rearranged in the selection order, and then sends them to the memory 112 one after another. The initial values of the tap group numbers set in the memory 150 may be tap group numbers arranged in an arbitrary order. For instance, tap group numbers may be set in the increasing order or may be set randomly.

In the above example, the initial values are expressed in the increasing order by:

Z(1)=1

Z(2)=2

Z(3)=3

Z(4)=4

Z(5)=5 where Z(n) (n=1, 2, . . . , M) is a tap group number held in the memory 150.

The initial value of the address pointer defining the data reading position of the memory 150 is set to the top address. The top tap-group number, or Z(1)=1 in the above example, is output as the initial value to the selector 112. In response to the tap group selection signal, the selector 112 first selects the memory $110_j$ to extract the tap number stored at the top, and transmits it to the memory 114.

The reading address pointer is changed by the "change signal" output from the tap-group selection information updating circuit 140. The reading address pointer to the tap group stored in the memory 150 is incremented by 1 every time the tap-group selection information updating circuit 140 outputs the "change signal".

The coefficient value evaluator 130 takes the absolute value of coefficients and sums them up for each tap group. The ratio of the maximum value $C_{max}$ of the sum of absolute coefficients for each tap group to the sum of absolute coefficients in each tap group is computed. For instance, for $c_{j, max}$ ($1 \leq j \leq M$) being the sum of absolute coefficients in each tap group and M being the number of tap groups, the ratio $R_j = c_{j, max}/C_{max}$ is computed. The result is transmitted to the step-size generator 160. The same results can be obtained by defining the total of the sums of the absolute coefficients of tap groups as $C_{max}$.

The step-size generator 160 generates step sizes using $R_j$ from the coefficient value evaluator 130 and then outputs them respectively to the corresponding output terminals $901_i$ (i=1, ., . . , L). The step size $\mu_j$ is determined by the equation $\mu_j = \mu \times R_j$, where $\mu$ is a predetermined constant. The relationship between j and i ($1 \leq i \leq L$) is computed using the tap position control signal from the memory 114 such that the step size used to update coefficients belonging to the j-th tap group is $\mu$ J.

According to this step-size computing method, the step size on updating coefficients in a tap group with large coefficient absolute values becomes large so that the convergence time of the adaptive filter is shortened. The coefficient update control signal 602 received via the input terminal 907 is multiplied by $\mu_j$. The resulting products are output as the actual step sizes to the output terminals $901_1$ to $901_N$. In other words, when the coefficient update control signal 602 is 0, the coefficient adaptation is skipped. The step sizes supplied to the output terminals $901_1$ to $901_N$ are transmitted to the corresponding generators $30_i$.

The maximum value detector 180 receives "coefficient sum" and "order" from the coefficient value evaluator 130 and then selects the maximum coefficient sum to output to the output terminal 906. That is, the maximum coefficient sum is transmitted as tap position information to the controller 71 (FIG. 1). The step-size generator 160 multiplies the step size control signal 602 received via the input terminal 907 by $\mu_j$. When the step size control signal 602 is zero, the coefficient adaptation is skipped.

Figure 9:
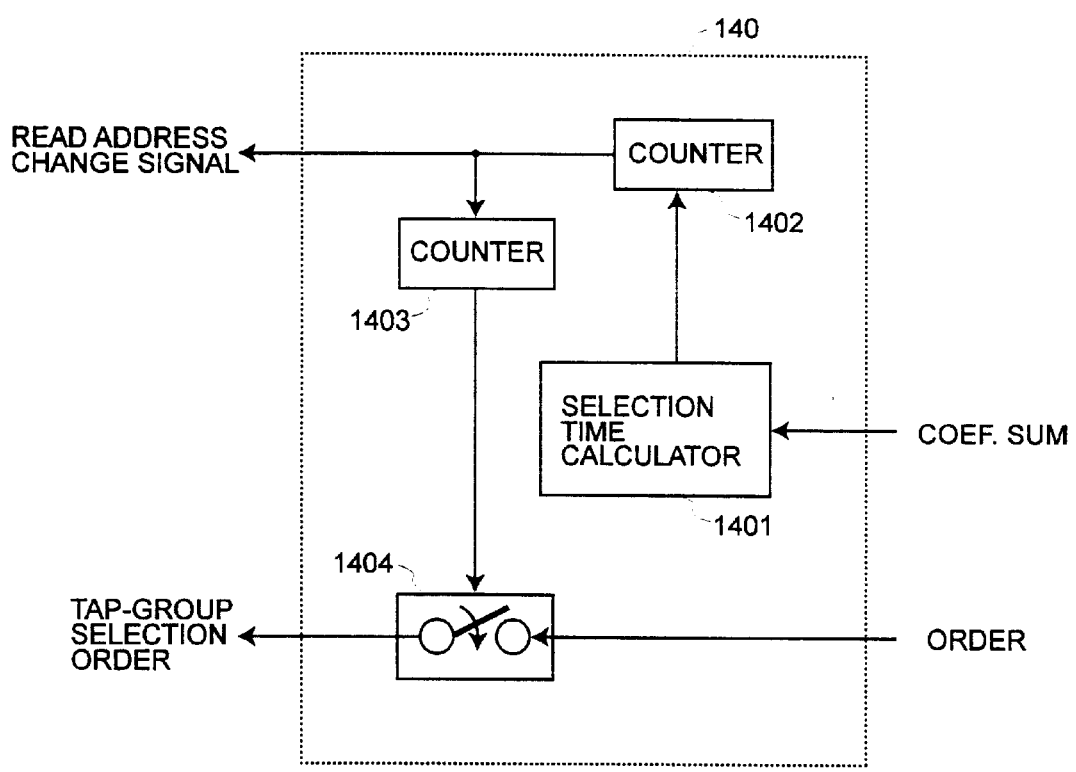
FIG. 9 is a block diagram illustrating the configuration of a tap-group selection information updating circuit in a tap controller according to the fourth embodiment of the present invention.

FIG. 9 is a block diagram illustrating the configuration of the tap group selection information updating circuit 140. The "coefficient sum" from the coefficient value evaluator 130 is transmitted to the selection time calculator 1401. The selection time calculator 1401 calculates the time during which the selector 112 continues to select each tap group, based on "coefficient sum". Specifically, the selection time calculator 1401 assigns a longer selection time with a tap group with a large absolute coefficient sum to prolong the selection time thereof, thus, intensively setting new active taps in the tap group.

As to the above example, the reference 11 discloses that the i-th tap group selection continuous time, $T_j$ (j=1, 2, 3, 4, 5), is expressed by:

$$T_j = \frac{A_j}{A_{\max}} \cdot (T_{\max} - T_{\min}) + T_{\min} \tag{16}$$

where $A_j$ is the sum of the absolute coefficients in the i-th tap group, $A_{max}$ is the maximum value of sums of the absolute of coefficients in tap groups, $T_{max}$ is the maximum value of the tap group selection times, and $T_{min}$ is the minimum value of the tap group selection times.

In other words, the selection time for a tap group with the minimum sum of absolute coefficients is set to $T_{min}$. The selection time for a tap group with the maximum sum of absolute coefficients is set to $T_{max}$. The selection times for other tap groups are set to the values corresponding to the sum of absolute coefficients.

$T_j$, generally represented with the number of coefficient updates, is transmitted to the counter 1402. The counter 1402 counts the number of coefficient updates. The counter 1402 supplies a read address change signal to the counter 1403 and the memory 150 every time number of the coefficient update reaches $T_j$. The counter 1403 counts up every time it receives the read address change signal from the counter 1402. When counting up to the total number M of tap groups, the counter 1403 transmits a signal to change the tap group selection order to the switch 1404, thus, resetting the count to zero.

In response to the signal to change the tap group selection order, the switch 1404 closes the circuit and then outputs tap group numbers supplied as "order" from the coefficient value evaluator 130, as "tap group selection order" in the supplied order. The output signals are sequentially written in from the smallest address of the memory 150. This writing operation changes the selection order of tap groups held in the memory 150.

The input signal evaluator 170 receives the input signal sample to the delay element $20_i$ and the input signal samples at the outputs of the delay elements $20_i$ to $20_{N-1}$ via the input terminals $904_o$ to $904_{N-1}$. The input signal evaluator 170 evaluates the input signal power using the input signal samples. When the input signal power is smaller than a first predetermined threshold, the input signal evaluator 170 outputs a coefficient update skip signal.

The step-size generator 160 receives the coefficient update skip signal and then resets all step sizes to zero. Hence, the step sizes transmitted to the coefficient generators $30_l$ to $30_L$ via the output terminals $901_l$ to $901_L$ become zero. That is, the coefficient updating operation is performed but the coefficients are not actually updated.

When the input signal power is smaller than a second predetermined threshold, the input signal evaluator 170 outputs a tap position update skip signal. In order to skip the tap position control, the tap position update skip signal is transmitted to the memory 114, the coefficient value evaluator 130, the tap group selection information update circuit 140 and the minimum coefficient detector 116.

The memory 114 receives the tap position update skip signal and then skips the operation of replacing the tap number supplied from the minimum coefficient detector 116 by the tap number supplied from the selector 112. In response to the tap position update skip signal, the coefficient value evaluator 130 skips computation of "coefficient sum" and "order" and their transmission to the tap group selection information updating circuit 140.

In response to the tap position update skip signal, the tap group selection information updating circuit 140 skips update of the tap group selection information. In response to the tap position update skip signal, the minimum coefficient detector 116 stops detecting the tap number corresponding to the minimum absolute coefficient and transmitting the detected tap number to the memory 114, the evaluator 120, the distributor 118 and the coefficient clear circuit 122. Thus, a series of skip operations disable the tap position control.

Figure 10:
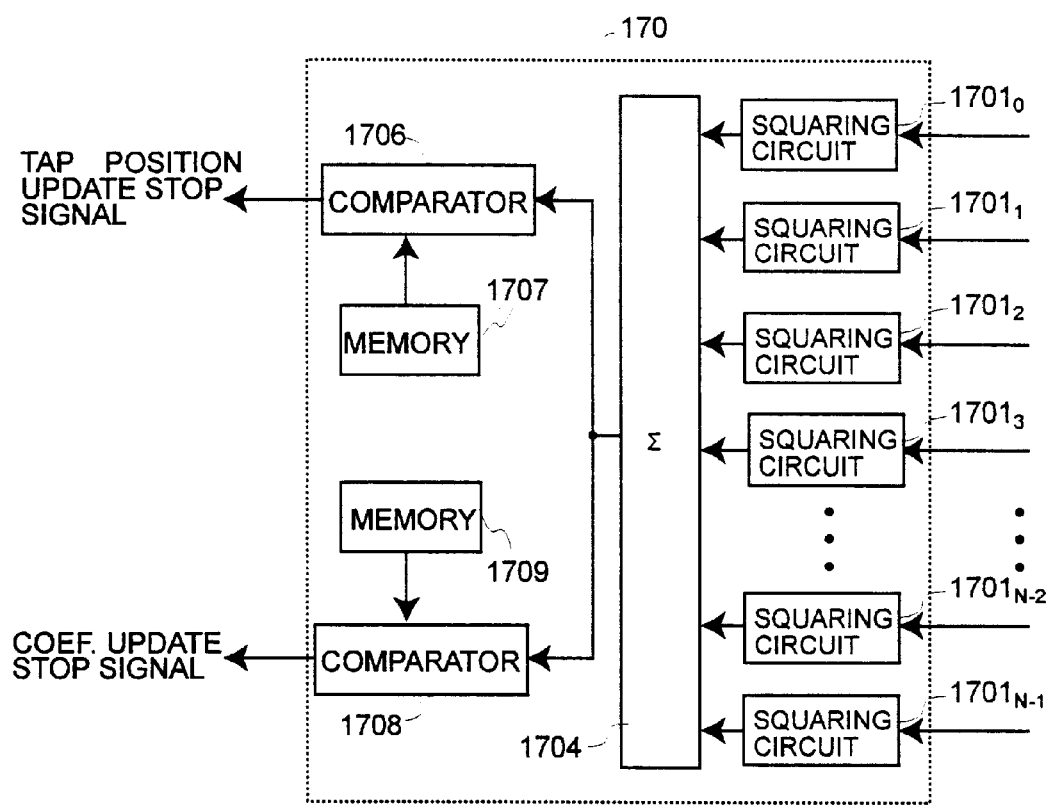
FIG. 10 is a block diagram illustrating the configuration of an input signal evaluator in a tap controller according to the fourth embodiment of the present invention.

FIG. 10 is a block diagram illustrating the configuration of the input signal evaluator 170. The squaring circuits $1701_o$ to $1701_{N-1}$ respectively square the input signal samples, which are supplied to the input signal evaluator 170, at the input of the delay element 201 and at the outputs of the delay elements $20_o$ to $20_{N-1}$ and then output the results to the adder 1704. The adder 1704 adds all the squared input signal samples and then outputs the obtained input signal power to the comparators 1706 and 1708.

The comparator 1706 compares the input signal power from the adder 1704 with the first threshold from the memory 1707 while the comparator 1708 compares the input signal power from the adder 1704 with the second threshold from the memory 1709. When the input signal power is smaller than the first threshold value, the comparator 1706 outputs a tap position update skip signal. When the input signal power is smaller than the second threshold value, the comparator 1708 outputs a coefficient adaptation skip signal.

The configuration and operation of the adaptive filter 83 has been described by referring to FIG. 6. The configuration and operation of the adaptive filters 84 and 85 shown in FIG. 1 are completely identical to those of the adaptive filter 83. Moreover, FIG. 1 shows the case where the number of adaptive filters is three. A similar description is applicable to the cases where the number of adaptive filters is greater than three.

According to the fifth embodiment of the invention, the tap controller 91 of FIG. 8 employs the input signal evaluator 171, instead of the input signal evaluator 170. The input signal evaluator 171 evaluates the absolute value of the input signal using the input signal samples. When the sum of the absolute values of the input signal samples is smaller than the first threshold, the input signal evaluator 171 outputs a coefficient adaptation skip signal. Moreover, when the sum of the absolute values of the input signal samples is smaller than the second threshold, the input signal evaluator 171 outputs a tap position control skip signal.

Figure 11:
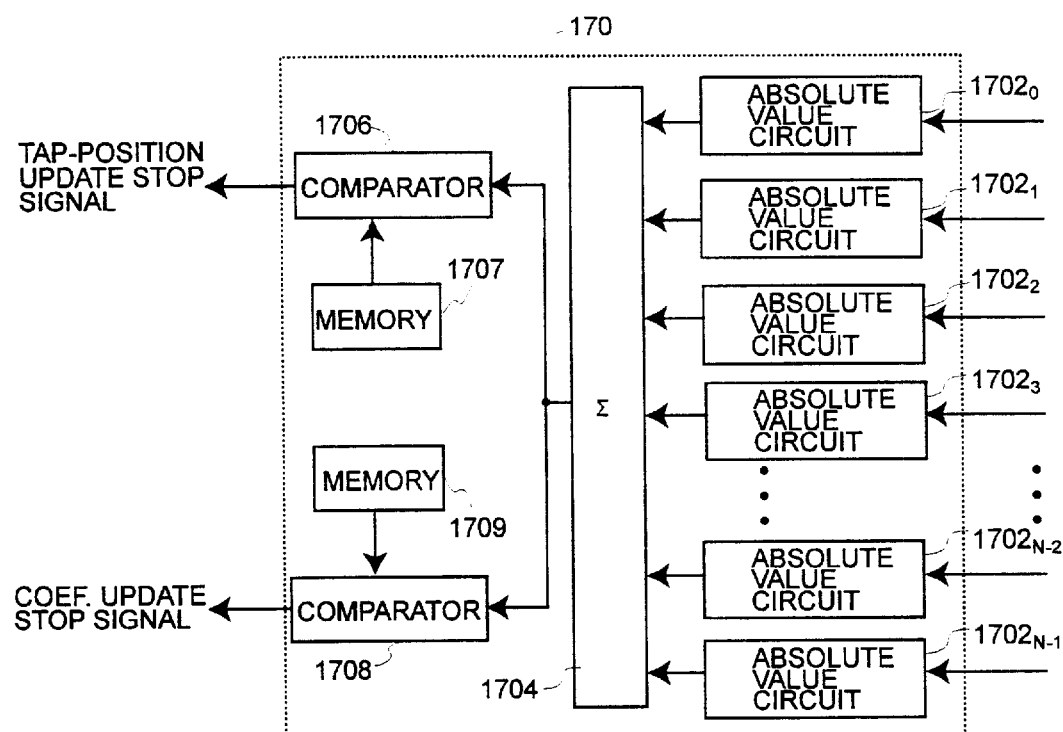
FIG. 11 is a block diagram illustrating the configuration of the input signal evaluator according to the fifth embodiment of the present invention.

FIG. 11 is a block diagram illustrating details of the input signal evaluator 171. The input signal evaluator 171 differs from the input signal evaluator 170 in that the absolute value circuits $1702_o$ to $1702_{N-1}$ are substituted for the squaring circuits $1701_o$ to $1701_{N-1}$. The signals input to the adder 1704 are the absolute value of the input signal samples instead of the squared values. The adder 1704 takes the sum of the absolute value of the input signal samples and then outputs the sum to the comparators 1706 and 1708. Other configuration and operation are similar to those of the input signal evaluator 170 and hence the duplicate description will be omitted here.

According to the sixth embodiment of the invention, the tap controller 91 of FIG. 8 employs the input signal evaluator 172, instead of the input signal evaluator 170. The input signal evaluator 172 holds the coefficient update skip signal and the tap position update skip signal (obtained in the same configuration and operation as those of the input signal evaluation signal 170) for a predetermined period of time and then releases them. This holding operation halts the coefficient updating and tap-position updating for a while after the coefficient update halt signal and the tap position update halt signal have been output.

Figure 12:
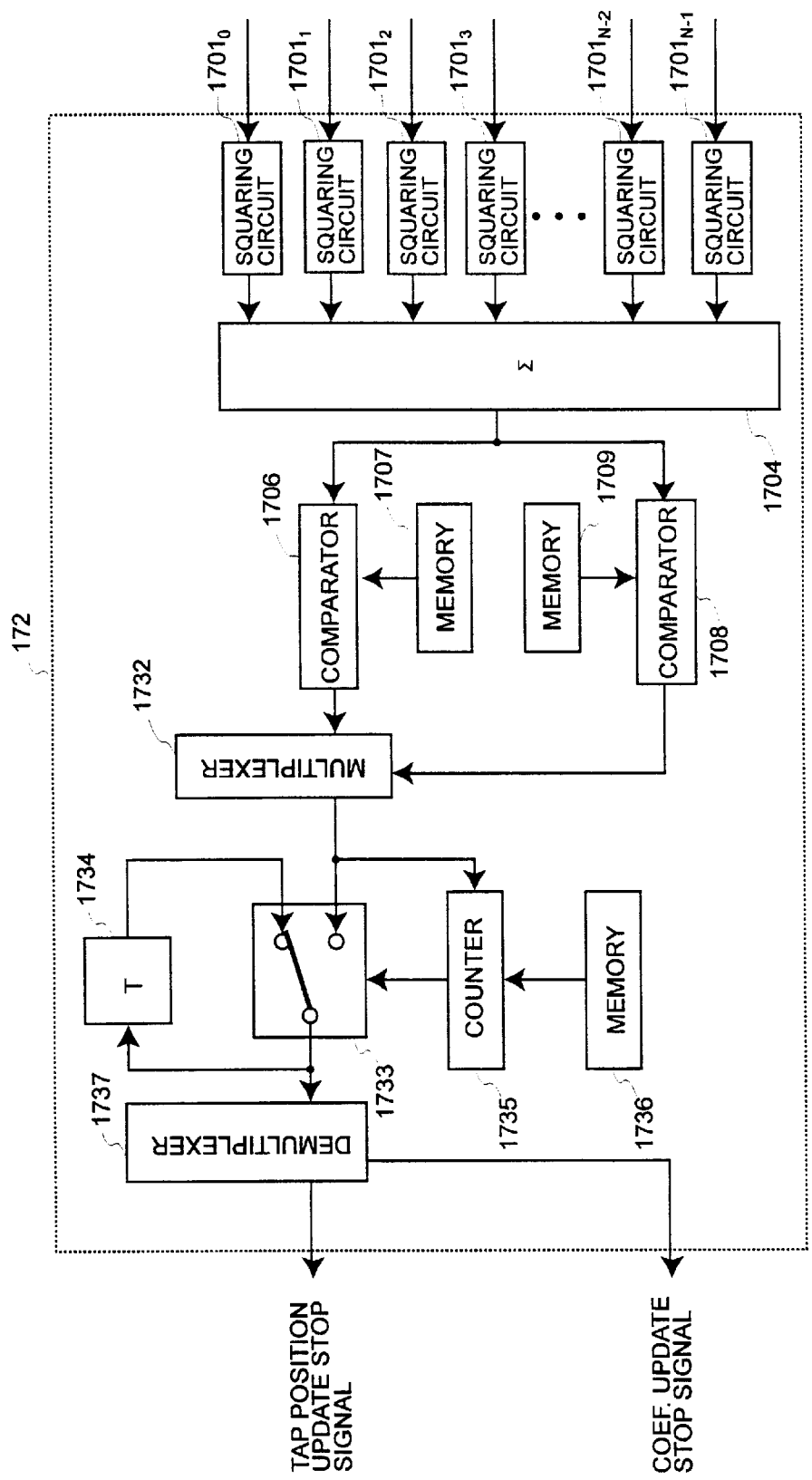
FIG. 12 is a block diagram illustrating the configuration of the input signal evaluator according to the sixth embodiment of the present invention.

FIG. 12 is a block diagram illustrating details of the input signal evaluator 172. The input signal evaluator 172 differs from the input signal evaluator 170 in that the outputs of the comparators 1706 and 1708 are processed by the multiplexer 1732, the memory 1736, the counter 1735, the switch 1733, the delay element 1734 and the demultiplexer 1737.

The multiplexer 1732 multiplexes the coefficient update skip signal from the comparator 1706 and the tap position update skip signal from the comparator 1708 and then outputs the multiplexed signal to one terminal of the switch 1733 and the counter 1735. The output signal of the switch 1733 is fed back to the other input terminal thereof via the delay element 1734.

That is, when the switch 1733 selects the feedback route, the output of the switch 1733 is held. When the switch 1733 selects the other input terminal, a new multiplexed signal is output. The demultiplexer 1737 separates the output of the switch 1733 into a coefficient update skip signal and a tap position update skip signal and then outputs them separately. The switch 1733 is controlled by the counter 1735.

The counter 1735 is reset in response to the multiplexed signal from the multiplexer 1732 and then starts its count-up operation. At the same time, the route is changed such that the switch 1733 selects the feedback signal from the delay element 1734. The count-up operation is carried out using a clock with the same frequency as the sampling frequency of the input signal.

When the count is equal to the output from the memory 1736, the counter 1735 produces a changeover signal. In response to the changeover signal from the counter 1735, the switch 1733 changes to select the multiplexed signal from the multiplexer 1732 as its output. Other configuration and operation are identical to those of the input signal evaluator 170 and hence the duplicate description will be omitted here.

According to the seventh embodiment of the invention, the tap controller 91 of FIG. 8 employs the input signal evaluator 173, instead of the input signal evaluator 172. The input signal evaluator 173 evaluates the absolute values of the input signal samples. When the sum of the absolute values of input signal samples is smaller than the first predetermined threshold, the input signal evaluator 173 outputs a coefficient update skip signal. When the sum of the absolute values of the input signal samples is smaller than the second predetermined threshold, the input signal evaluator 173 outputs a tap position update skip signal.

Figure 13:
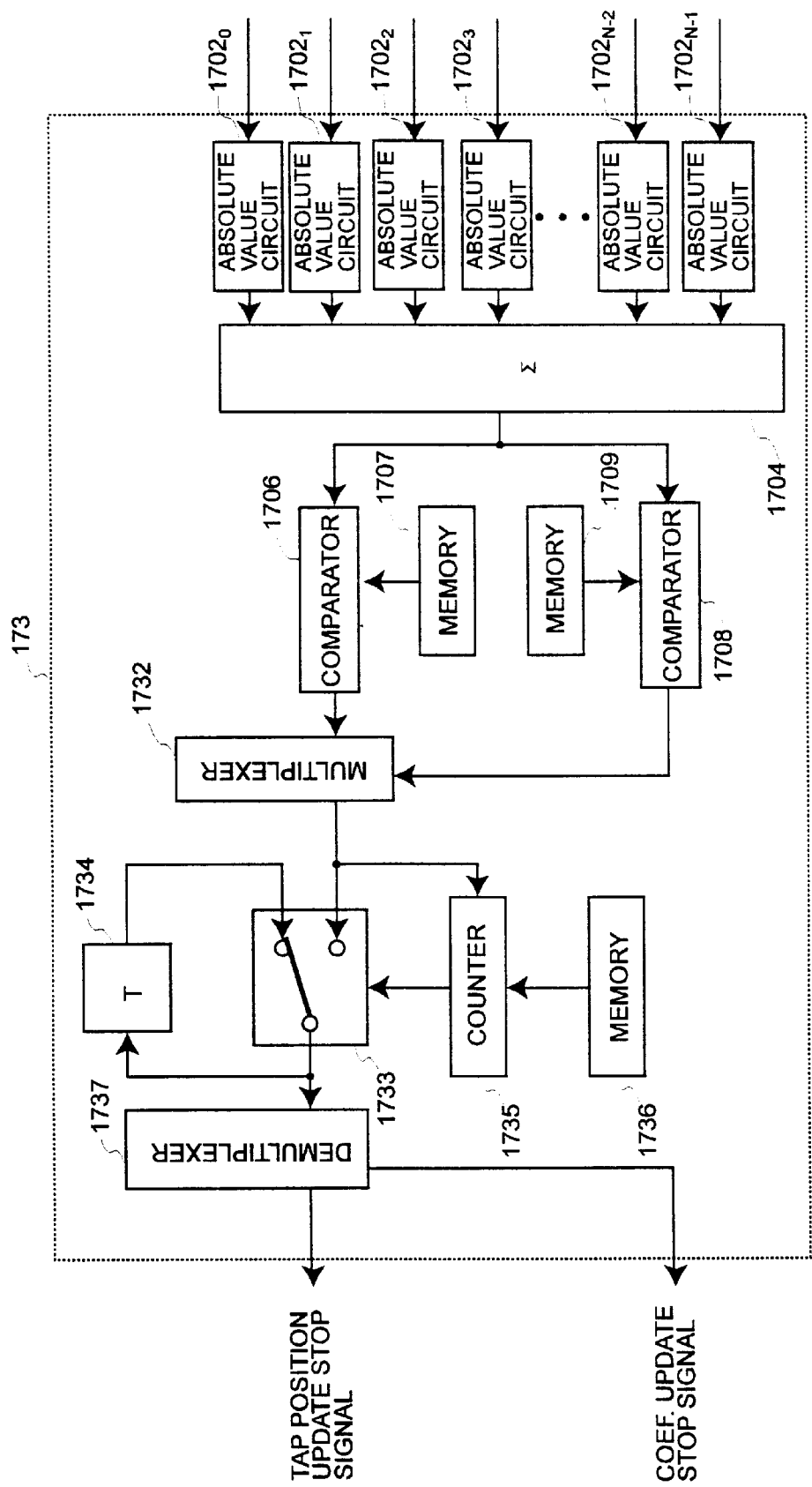
FIG. 13 is a block diagram illustrating the configuration of the input signal evaluator according to the seventh embodiment of the present invention.

FIG. 13 is a block diagram illustrating details of the input signal evaluator 173. The input signal evaluator 173 differs from the input signal evaluator 172 in that the absolute value circuits $1702_o$ to $1702_{N-1}$ are substituted for the squaring circuits $1701_o$ to $1701_{N-1}$. The signals input to the adder 1704 are the absolute value of the input signal samples instead of the square values of the input signal samples. The adder 1704 takes the sum of the absolute values of input signal samples and then outputs the sum to the comparators 1706 and 1708. Other configuration and operation are identical to those of the input signal evaluator 172 and hence the duplicate description will be omitted here.

In FIGS. 12 and 13, the multiplexed signal, obtained by multiplexing the coefficient update skip signal and the tap position update skip signal, is supplied to one terminal of the switch 1733. However, the coefficient update skip signal and the tap position update skip signal may be independently input to the input terminal of the switch 1733 without multiplication. This method does not require the multiplexer 1732 and the demultiplexer 1737, however, requires another circuit including the memory 1736, the counter 1735, the switch 1733, and the delay element 1734 to hold the skip signals.

In the above description, the adder 1704 takes the sum of the outputs of the input signal evaluator 170, 171, 172 or 173. However, the adder 1704 may be constructed so as to take a partial sum of the output signals of the input signal evaluator 170, 171, 172 or 173.

For instance, the adder 1704 in the input signal evaluator 170 may add only the outputs of the squaring circuits $1701_o$ to $1701_{K-1}$ where k is a positive integer smaller than N. Moreover, the adder 1704 in the input signal evaluator 170 may add only the outputs of the squaring circuits $1701_k$ to $1701_{N-1}$. Moreover, the adder 1704 in the input signal evaluator 170 may add K arbitrary outputs elected from the outputs of the square circuits $1701_o$ to $1701_{N-1}$.

Now, let us assume that the adder 1704 in the input signal evaluator 172 adds only the outputs of the squaring circuits $1701_o$ to $1701_{N/M-1}$. These outputs correspond to the input samples to the delay elements in the first tap group. The input signal evaluator 172 evaluates the input signal samples so that arrival of a silent section at the tapped delay line formed by delay elements $20_l$ to $20_{N-1}$ can be quickly detected.

After the detection of arrival of the silent section, the coefficient update skip signal and the tap position update skip signal are maintained for a period specified by the value stored in the memory 1736, so that the coefficient update and the tap-position control can be stopped until the silent section comes out of the tapped delay line. In this case, the value stored in the memory 1736 is somewhat larger than the number (N) of all delay elements.

Figure 14:
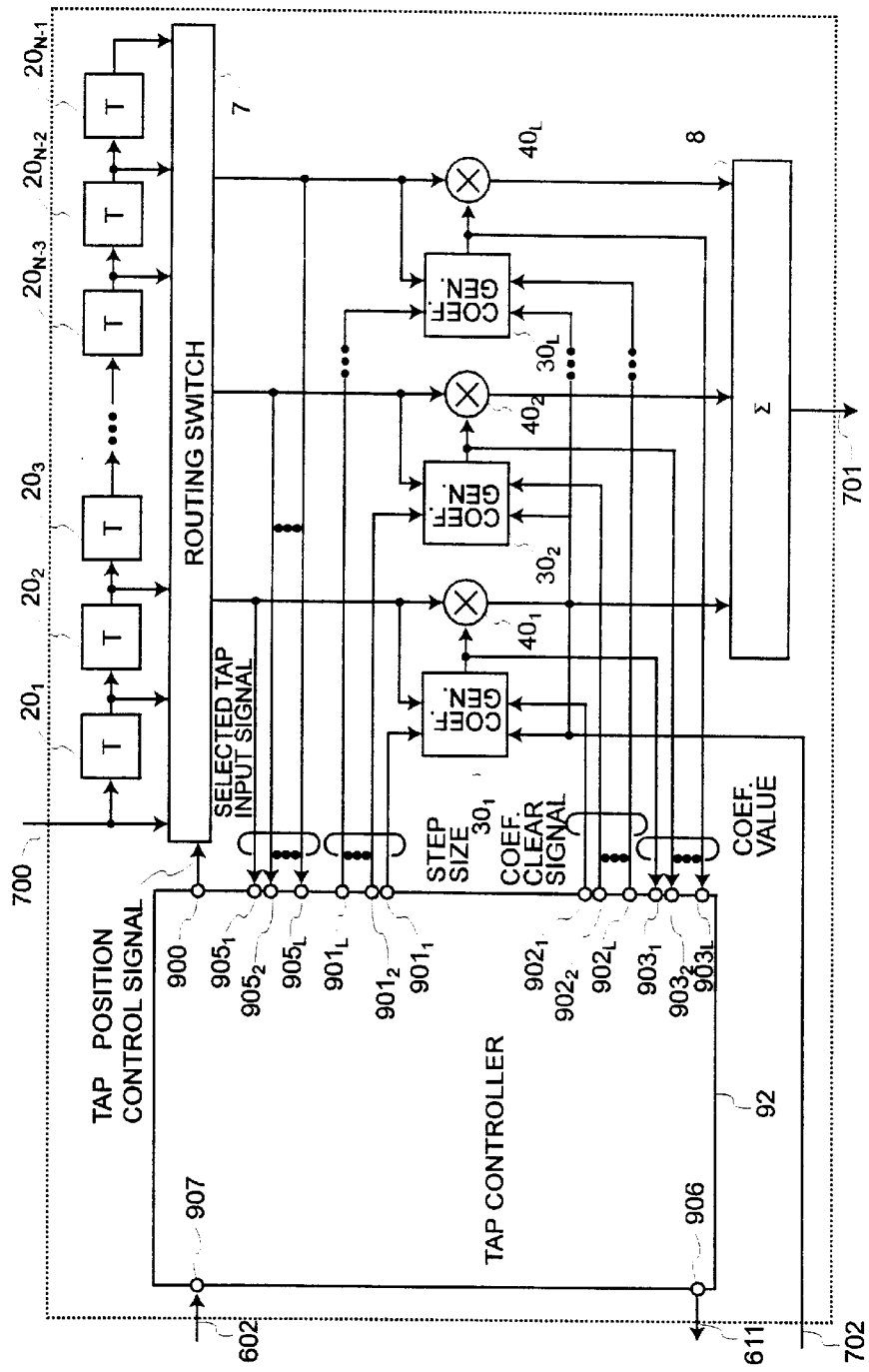
FIG. 14 is a block diagram illustrating the configuration of an adaptive filter according to the eighth embodiment of the present invention.

FIG. 14 is a block diagram illustrating the adaptive filter according to the eighth embodiment. The eighth embodiment differs from the fourth embodiment in that the tap controller 92 (FIG. 14) is substituted for the tap controller 91 (FIG. 6). The tap controller 91 evaluates the signal at the input of the delay element $20_l$ and the signals at the outputs of the delay elements $20_l$ to $20_{N-1}$ received via the input terminals $904_o$ to $904_{N-1}$, thus, skipping the coefficient update and the tap-position control. However, the tap controller 92 evaluates input signal samples corresponding to active taps received via the input terminals $905_l$ to $905_L$, thus, skipping the coefficient update and the tap-position control. Hence, input signal samples corresponding to active taps are supplied with the input terminals $905_1$ to $905_L$ of the tap controller 92.

Figure 15:
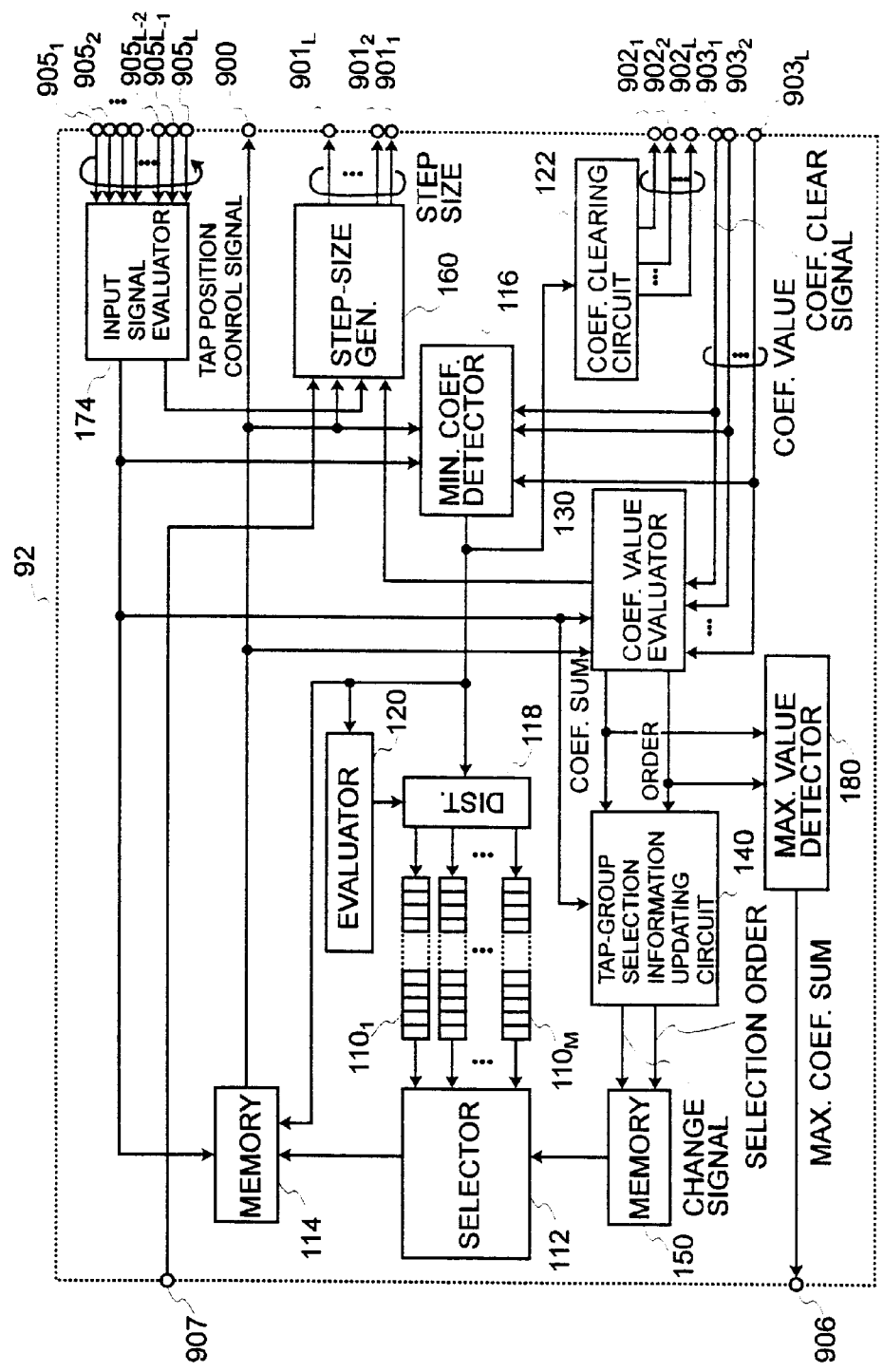
FIG. 15 is a block diagram illustrating the configuration of the tap controller in the adaptive filter according to the eighth embodiment of the present invention.

FIG. 15 is a block diagram illustrating the configuration of the tap controller 92. The tap controller 92 differs from the tap controller 91 of FIG. 8 in that the input signal evaluator 174 is substituted for the input signal evaluator 170. Hence, the difference in operation will be described in detail below.

The input signal evaluator 174 receives input signal samples from the delay elements $20_i$ via the input terminals $905_l$ to $905_L$. The actual value i is specified by the routing switch 7. The input signal evaluator 174 evaluates the input signal power using the input signal samples. When the input signal power is smaller than a first predetermined threshold, the input signal evaluator 174 outputs a coefficient update skip signal. When the input signal power is smaller than a second predetermined threshold, the input signal evaluator 174 outputs a tap position update skip signal. The operation of skipping the coefficient update using the coefficient update skip signal as well as the operation of skipping the tap position update using the tap position update skip signal are identical to those in the input signal evaluator 170. Hence, the duplicate description will be omitted here.

The input signal evaluator 170 of FIG. 10 can be used as the input signal evaluator 174 without any change. Referring to FIG. 10, the squaring circuits $1701_o$ to $1701_{N-1}$ are used for N inputs. However, L squaring circuits $1701_o$ to $1701_{L-1}$ are used for the input signal evaluator 174.

Similarly, the input signal evaluator 170 of FIG. 11, 12 or 13 can be used as the input signal evaluator 174 by increasing or decreasing the number of squaring circuits or the number of absolute value circuits. Likewise, the input signal evaluator 170 in which the adder 1704 takes a partial sum of the processed signals of the inputs can also be used as the input signal evaluator 174.

Figure 16:
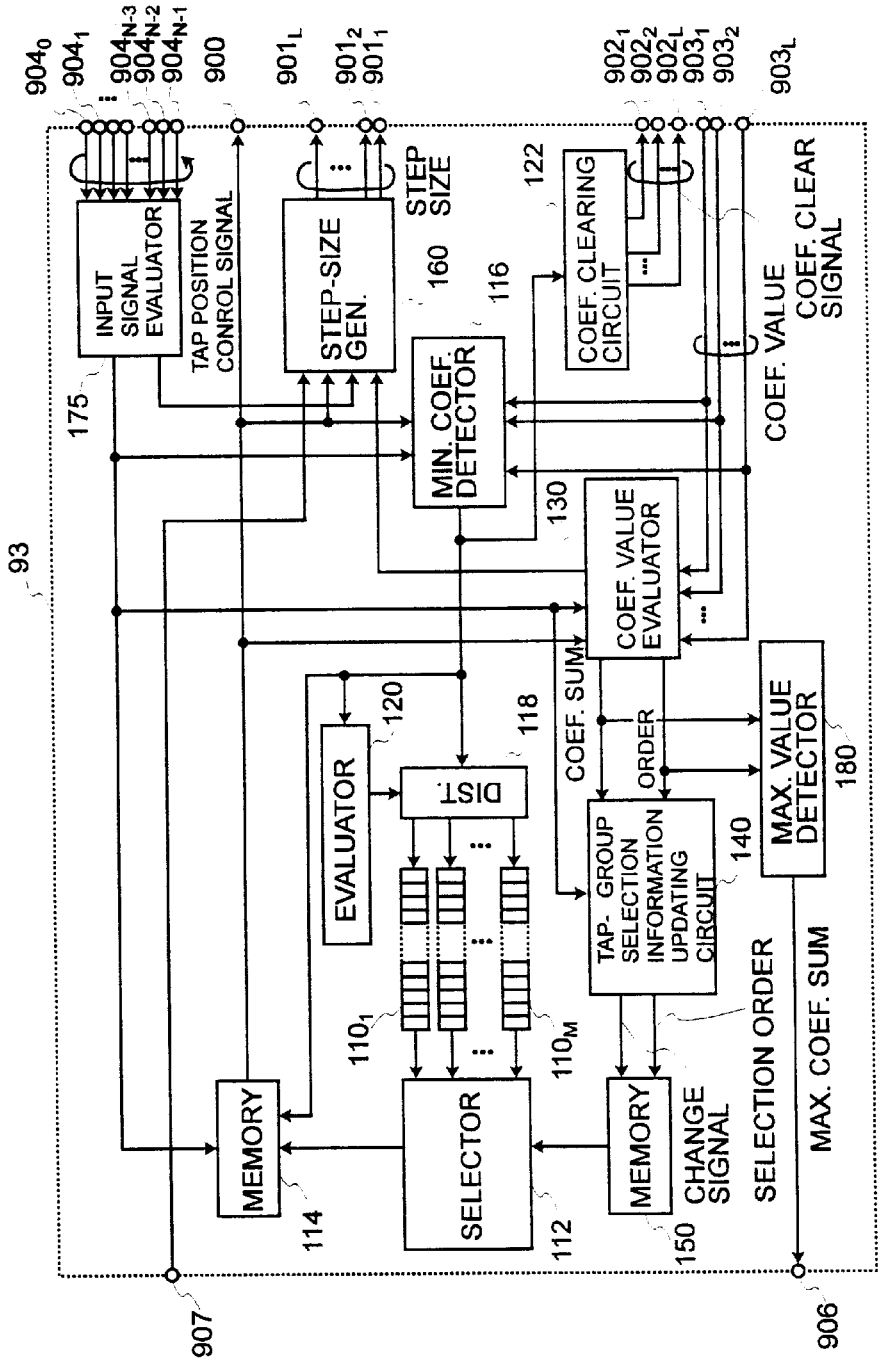
FIG. 16 is a block diagram illustrating the configuration of the tap controller in the adaptive filter according to the ninth embodiment of the present invention.

According to the ninth embodiment of the present invention, the tap controller 93 is substituted for the tap controller 92 of the eighth embodiment shown in FIG. 15. FIG. 16 is a block diagram illustrating the configuration of the tap controller 93. This configuration differs from that of FIG. 15 in that the input signal evaluator 175 is used instead of the input signal evaluator 174. The difference of the embodiment will be chiefly described in detail in connection with the difference.

The input signal evaluator 174 of FIG. 15 evaluates the input signal power in response to the input signal samples supplied from the routing switch 7 to the active taps. The coefficient update skip signal and the tap position update halt signal are output based on the evaluation results. In contrast, the input signal evaluator 175 of FIG. 16 evaluates the input signal power in response to the input signal samples at the input of the delay element $20_l$ and at the outputs of delay elements $20_l$ to $20_{N-1}$. Then, like the input signal evaluator 174, the coefficient update skip signal and the tap position skip signal are output based on the evaluation results. In this case, only the input signal samples supplied from delay elements corresponding to active taps are selectively used. For that reason, the tap position control signal is sent from the memory 114 to the input signal evaluator 175.

In other words, the input signal evaluator 174 and the input signal evaluator 175 are different in configuration, however, are equivalent in operation. Hence, the output signals are interchangeable. In the tap controller 93, constituent elements are identical to those in the tap controller 92 except the input signal evaluator 175 and the input signal evaluator 174. There are no differences in operation either in these controllers. Hence, the duplicate description will be omitted here.

Figure 17:
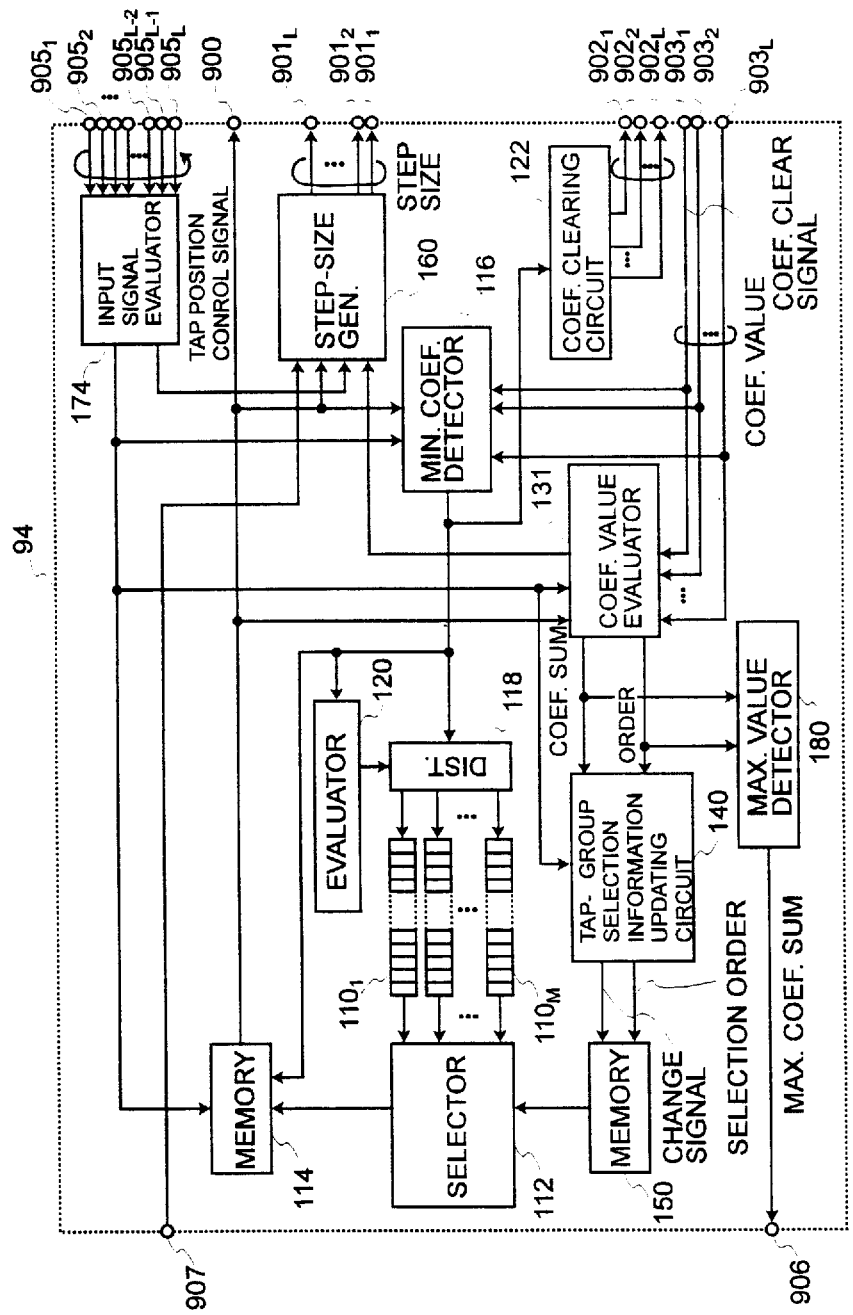
FIG. 17 is a block diagram illustrating the configuration of the tap controller in the adaptive filter according to the tenth embodiment of the present invention.

According to the tenth embodiment of the invention, the tap controller 94 is substituted for the tap controller 92 (of the eighth embodiment shown in FIG. 14). The tenth embodiment differs from the eighth embodiment in the tap controller 94. Here, the tap controller 94 will be described by referring to FIG. 17. FIG. 17 is a block circuit diagram illustrating the configuration of the tap controller 94. The tap controller 94 of FIG. 17 differs from the tap controller 92 in that the coefficient value evaluator 131 is used in place of the coefficient value evaluator 130. The difference in operation will be described below in detail.

The coefficient value evaluator 130 of FIG. 14 computes the sum of absolute coefficients for each tap group as coefficient sums. However, the coefficient value evaluator 131 computes the sum of squared coefficients for tap groups. The resulting sum of the squared coefficients is transmitted to the tap-group selection information updating circuit 140. The ratio $R_j$ transmitted to the step-size generator 160 is computed by $R_j = c_{j,max}/C_{max}$, where $c_{j,max}$ ($1 \leq j \leq M$) is the sum of squared coefficients instead of the sum of absolute coefficients in each tap group and $C_{max}$ is the maximum value of the sum of squared coefficients for each tap group.

In the tap controller 94, constituent elements are identical to those in tap controller 92 except the coefficient value evaluator 130 and the coefficient value evaluator 131. There are no differences in operation between tap controllers 92 and 94. Hence, the duplicate description will be omitted here. The description of the tap controller 92 is applicable to that of the tap controller 94 where the squared coefficients are substituted for the absolute coefficients.

Figure 18:
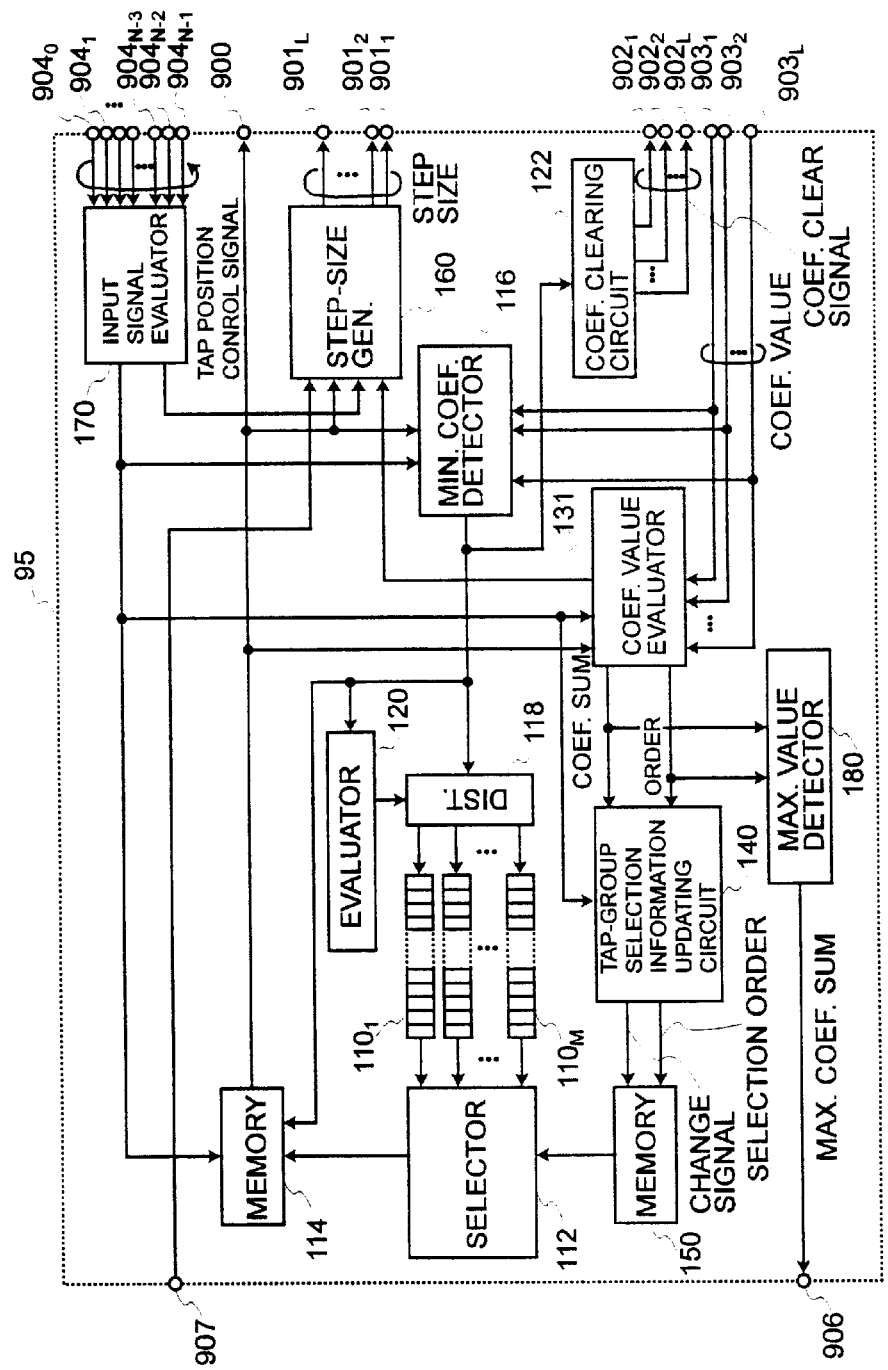
FIG. 18 is a block diagram illustrating the configuration of the tap controller in the adaptive filter according to the eleventh embodiment of the present invention.

According to the eleventh embodiment of the invention, the tap controller 95 shown in FIG. 18 is substituted for the tap controller 91 of the fourth embodiment shown in FIG. 8. The eleventh embodiment differs from the fourth embodiment in the tap controller 95. The relationship between the tap controllers 91 and 95 is equivalent to the relationship between the tap controllers 92 and 94. This has been described with reference to FIG. 17. Hence, the duplicate description will be omitted here.

Figure 19:
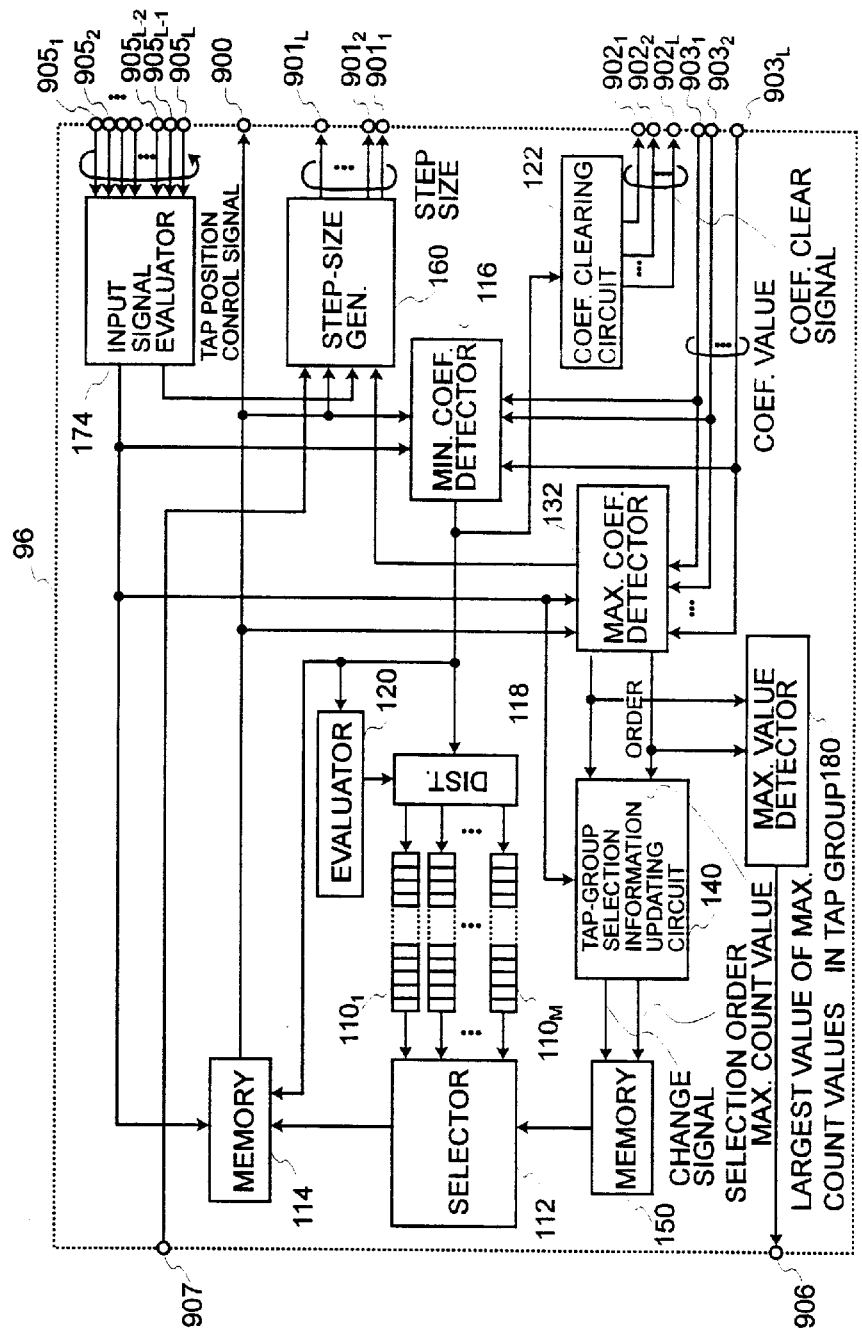
FIG. 19 is a block diagram illustrating the configuration of the tap controller in the adaptive filter according to the twelfth embodiment of the present invention.

According to the twelfth embodiment of the invention, the tap controller 96 is substituted for the tap controller 92 of the eighth embodiment shown in FIG. 8. The twelfth embodiment differs from the eighth embodiment in the tap controller 96. The tap controller 96 will be described here by referring to FIG. 19. FIG. 19 is a block diagram illustrating the configuration of the tap controller 96. The tap controller 96 of FIG. 19 differs from the tap controller 92 of FIG. 15 in that the maximum coefficient detector 132 is used instead of the coefficient value evaluator 130. The difference in operation will be chiefly described here in detail.

The coefficient value evaluator 130 computes as "coefficient sum" the sum of absolute coefficients for each tap group. However, the maximum coefficient detector 132 detects the maximum absolute coefficient for each tap group. The detected absolute coefficient is transmitted as "maximum coefficient value" to the tap group selection information updating circuit 140. The time during which each tap group is continuously selected is computed based on the "maximum coefficient value", instead of "coefficient sum." Moreover, M maximum values are rearranged in the order of magnitude. Then, the corresponding tap group numbers are transmitted as "order" to the tap group selection information updating circuit 140.

The maximum coefficient detector 132 computes the ratio of the maximum value $C_{max}$ of maximum coefficient values for tap groups to the maximum coefficient value for each tap group. For instance, provided that the maximum coefficient value of the j-th tap group for M tap groups is $c_{max}$ ($1 \leq j \leq M$), the ratio $R_j = c_{j,max}$, $C_{max}$ is computed and then transmitted to the step-size generator 160. Even if the sum of the maximum coefficients sum in each tap group is defined as $C_{max}$, the same result can be obtained.

In the tap controller 96, constituent elements are identical to those in the tap controller 92 except the coefficient value evaluator 130 and the maximum coefficient detector 132. There are no differences in operation between the tap controllers 92 and 96. Hence, the duplicate description will be omitted here. The description of the tap controller 92 is applicable to that of the tap controller 96 where the maximum absolute coefficient is substituted for the sum of absolute coefficients.

Figure 20:
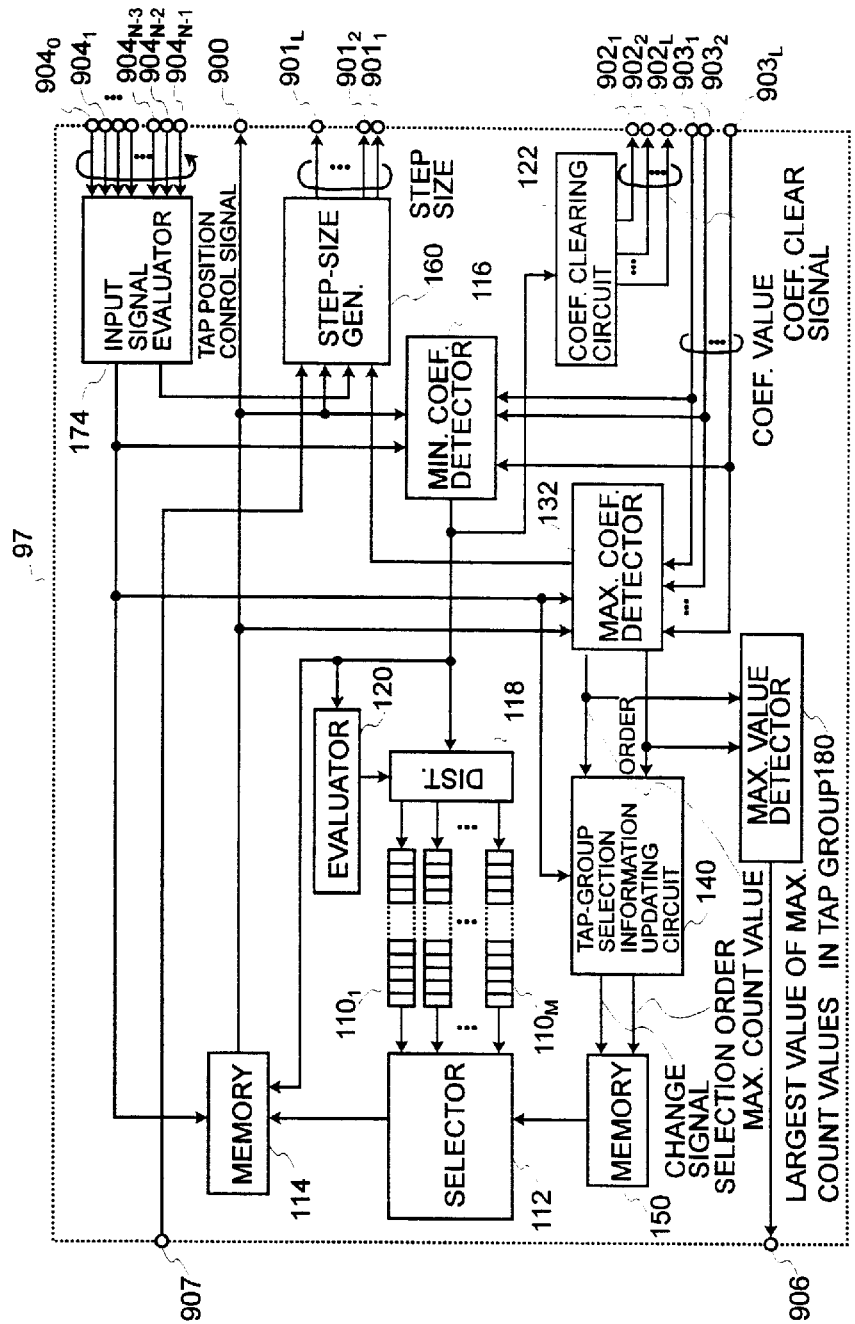
FIG. 20 is a block diagram illustrating the configuration of the tap controller in the adaptive filter according to the thirteenth embodiment of the present invention.

According to the thirteenth embodiment of the invention, the tap controller 97 shown in FIG. 20 is substituted for the tap controller 91 of the fourth embodiment shown in FIG. 8. The thirteenth embodiment differs from the fourth embodiment in the tap controller 97. The relationship between the tap controllers 91 and 97 is equivalent to the relationship between the tap controllers 92 and 96. This has been already described with reference to FIG. 19. Hence, the duplicate description will be omitted here.

Figure 21:
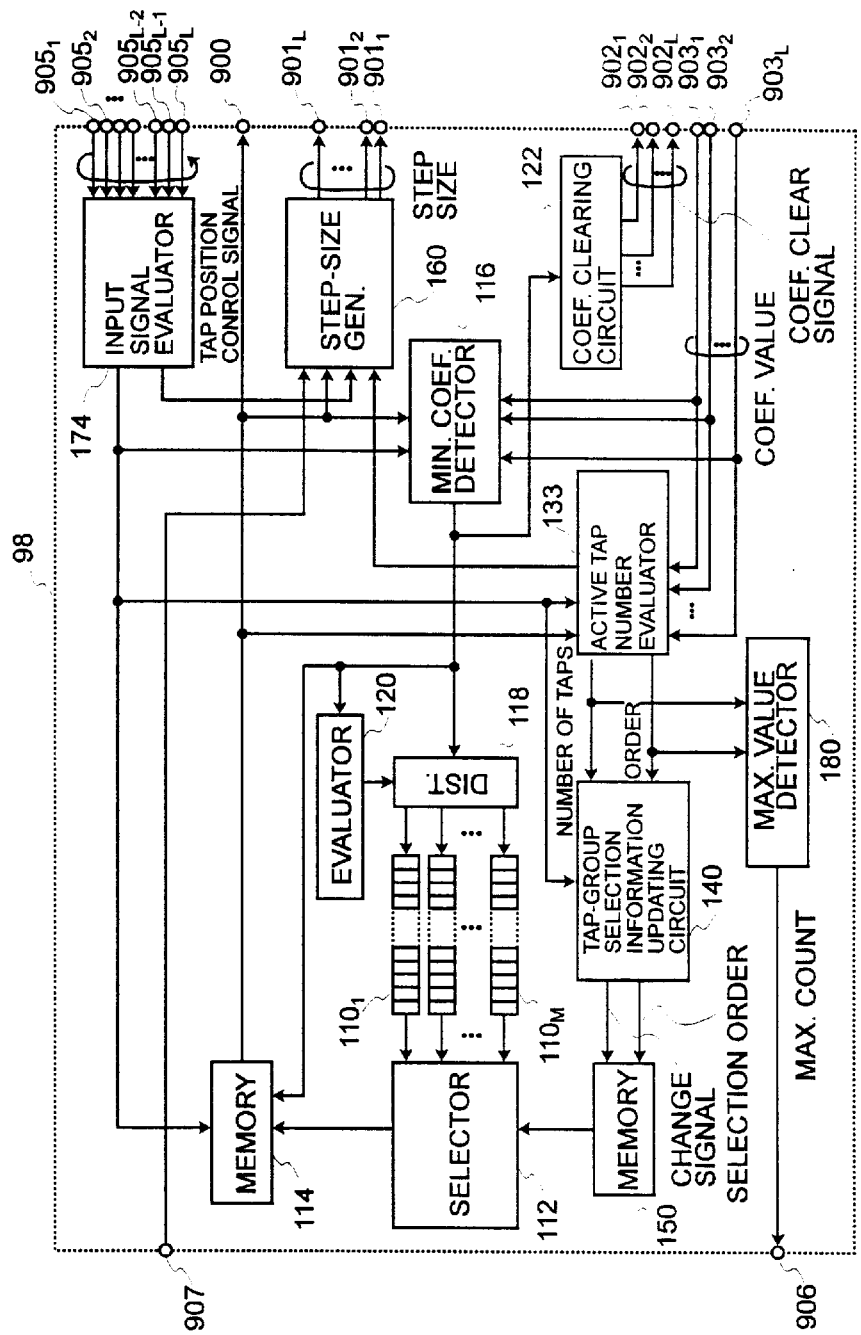
FIG. 21 is a block diagram illustrating the configuration of the tap controller in the adaptive filter according to the fourteenth embodiment of the present invention.

According to the fourteenth embodiment of the invention, the tap controller 98 is substituted for the tap controller 92 of the eighth embodiment shown in FIG. 14. The fourteenth embodiment differs from the eighth embodiment in the tap controller 98. The tap controller 98 will be described here by referring to FIG. 21. FIG. 21 is a block diagram illustrating the configuration of the tap controller 98. The tap controller 98 of FIG. 21 differs from the tap controller 92 of FIG. 15 in that the active tap number evaluator 133 is used instead of the coefficient value evaluator 130. The difference of the embodiment will be chiefly described here in detail in connection with the difference.

The coefficient value evaluator 130 of FIG. 14 computes, as "coefficient sum", the sum of coefficient values for each tap group. However, the active tap number evaluator 133 detects the number of active taps for each tap group. The number of detected active taps is transmitted as "number" to the tap group selection information updating circuit 140. The tap group selection information updating circuit 140 computes the time during which each tap group is continuously selected based on "number", instead of "coefficient sum".

The active tap number evaluator 133 computes the ratio of the maximum value $C_{max}$ of the number of active taps for each tap group to the number of active taps-for each tap group. For instance, provided that the number of active taps in each tap group for M tap groups is $c_{j,max}$ ($1 \leq j \leq M$), the ratio $R_j = c_{j,max}$, $C_{max}$ is computed and then transmitted to the step-size generator 160. Even if the sum of active taps in each tap group is defined as $C_{max}$, the same result can be obtained.

In the tap controller 98, constituent elements are identical to those in the tap controller 92 except the coefficient value evaluator 130 and the active tap count evaluator 133. There are no differences in operation between the tap controllers 92 and 98. Hence, the duplicate description will be omitted here. The description of the tap controller 92 is applicable to that of the tap controller 98 where the number of active taps is substituted for the absolute coefficients.

Figure 22:
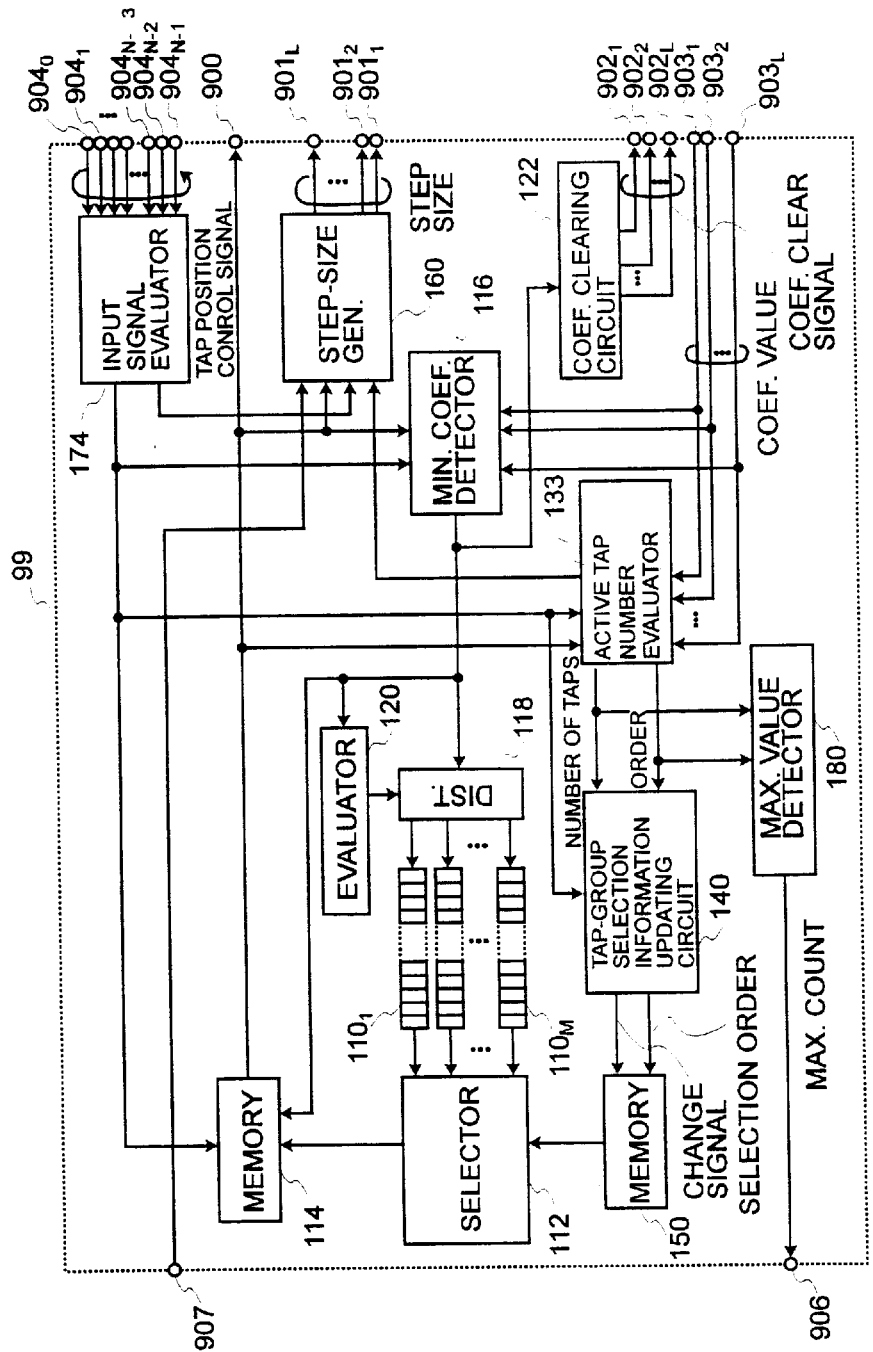
FIG. 22 is a block diagram illustrating the configuration of the tap controller in the adaptive filter according to the fifteenth embodiment of the present invention.

According to the fifteenth embodiment of the invention, the tap controller 99 of FIG. 22 is substituted for the tap controller 91 of the fourth embodiment shown in FIG. 8. The fifteenth embodiment differs from the fourth embodiment in the tap controller 99. The relationship between tap controllers 91 and 99 is equivalent to the relationship between the tap controllers 92 and 98. This has been described by referring to FIG. 21. The detail description will be omitted here.

As to the fourth through fifteenth embodiments of the invention, the coefficient value evaluator 130, the coefficient value evaluator 131 equivalent to the coefficient value evaluator 130, the maximum coefficient detector 132, and the active tap number evaluator 133 have been described. Basically, each evaluator or detector receives active tap numbers and the coefficients thereof from the memory 114 and the input terminals $903_1$ to $903_L$ and then transmits, in the order of magnitude, the values of the first evaluation index and the corresponding tap group number to the tap-group selection information updating circuit 140. Moreover, in the basic operation of each evaluator or detector, the degree of non-uniformity of the values of the second evaluation index regarding each tap group is transmitted to the step-size generator 160. The degree of non-uniformity is expressed either by the ratio of the sum of the values of the second evaluation index to the second evaluation index of each tap group or by the ratio of the maximum value of the second evaluation index to the second evaluation index of each tap group.

The sum of absolute coefficients, the sum of squared coefficients, the maximum absolute coefficient, and the number of active taps have been described as the first and the second evaluation indexes. It has been assumed that the first and the second evaluation indexes are same. However, other indexes may be used and the first evaluation index may be different from the second evaluation index. Next, an example where the first evaluation index and the second evaluation index are different from each other will be described.

Figure 23:
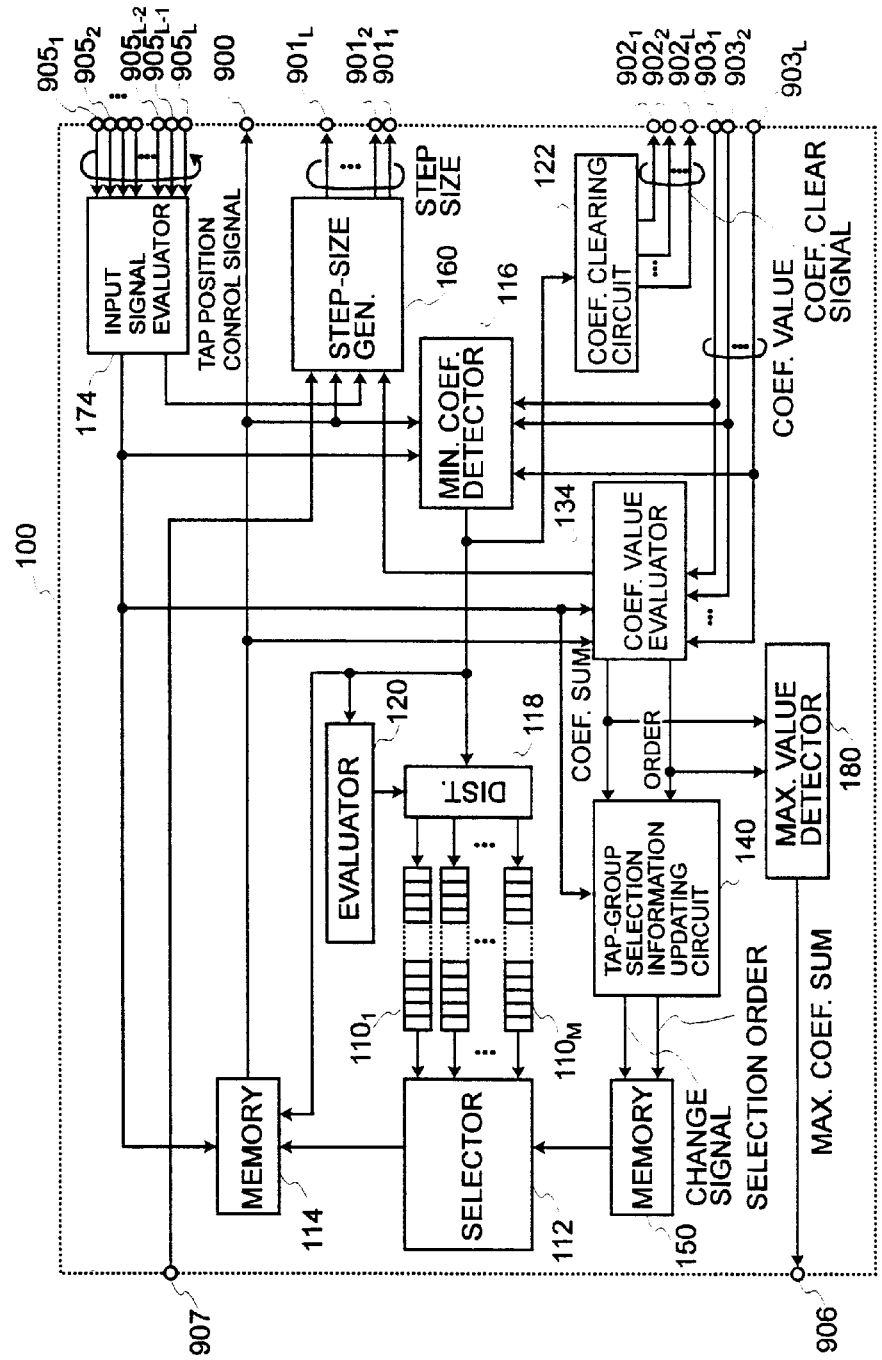
FIG. 23 is a block diagram Illustrating the configuration of the tap controller in the adaptive filter according to the sixteenth embodiment of the present invention.

According to the sixteenth embodiment of the invention, the tap controller 100 is substituted for the tap controller 92 of the eighth embodiment shown in FIG. 14. The sixteenth embodiment differs from the eighth embodiment in the tap controller 100. The tap controller 100 will be described here by referring to FIG. 23. FIG. 23 is a block diagram illustrating the configuration of the tap controller 100. The tap controller 100 of FIG. 23 differs from the tap controller 92 of FIG. 15 in that the coefficient value evaluator 134 is used instead of the coefficient value evaluator 130. The detailed operation of the embodiment will be chiefly described here in connection with the difference.

The coefficient value evaluator 134 receives the tap coefficients from coefficient generators and the active tap number from the memory 114 and then transmits "coefficient sum" and "order", obtained in the same manner as that of the coefficient value evaluator 130, to the tap group selection information updating circuit 140. The coefficient value evaluator 134 computes the ratio of the maximum value $C_{max}$ of the maximum absolute coefficient for each tap group to the maximum absolute coefficient in each tap group. For instance, provided that the maximum absolute coefficient in each tap group for M tap groups is $c_{j,max}$ ($1 \leq j \leq M$), the ratio $R_j = c_{j,max}$, $C_{max}$ is computed and then transmitted to the step-size generator 160. The same result can be obtained by defining the sum of maximum absolute coefficients in each tap group as $C_{max}$.

In the fourth through the sixteenth embodiments, an example where the step-size generator 160 creates different step sizes for each tap group has been described. However, the seventeenth embodiment can be constructed so as to create the same step sizes to each tap group.

Figure 24:
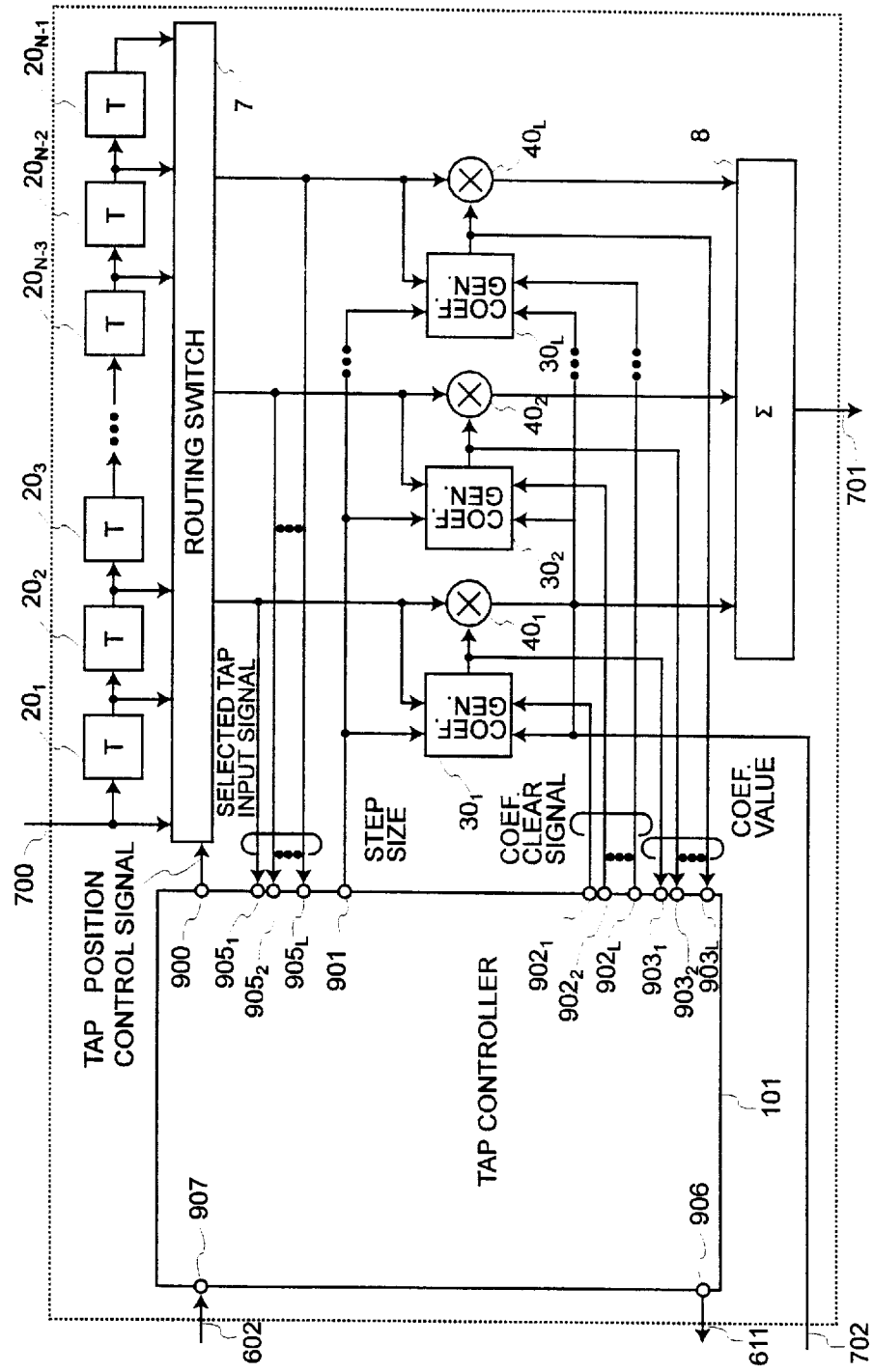
FIG. 24 is a block diagram illustrating the configuration of an adaptive filter according to the seventeenth embodiment of the present invention.

FIG. 24 is a block diagram illustrating the seventeenth embodiment of the present invention. This embodiment differs from the eighth embodiment in that the tap controller 101 (FIG. 24) is substituted for the tap controller 92 (FIG. 14). In FIG. 14, the tap controller 92 supplies different step sizes to the coefficient generators $30_l$ to $30_L$ via the output terminals $901_l$ to $901_L$. On the other hand, the tap controller 101 of FIG. 24 supplies the common step size to the coefficient generators $30_l$ to $30_L$ via the output terminal 901. For that reason, the tap controller 101 has only one output terminal $901_l$ instead of plural output terminals $901_l$ to $901_L$.

Figure 25:
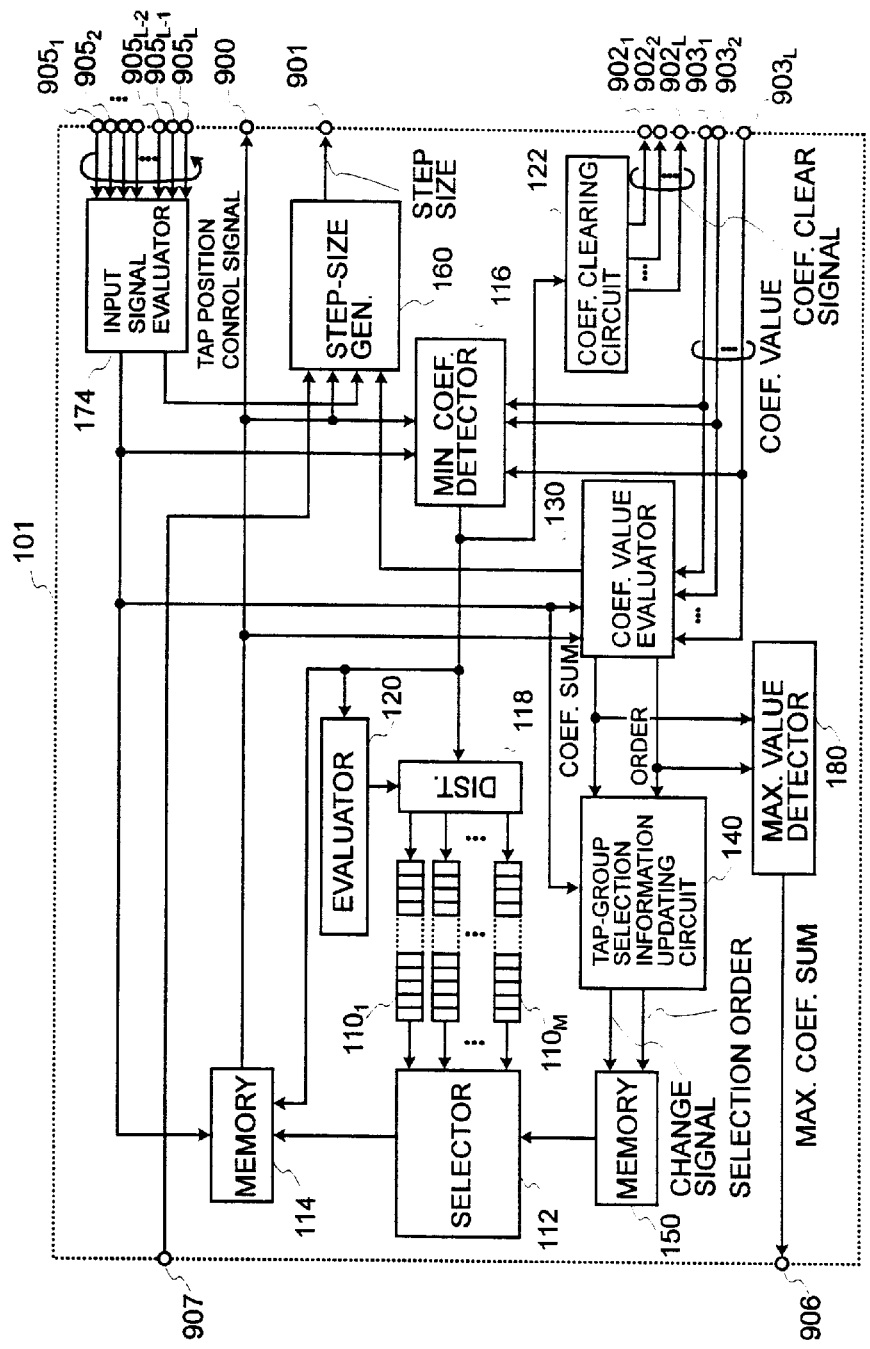
FIG. 25 is a block diagram illustrating the configuration of the tap controller in the adaptive filter according to the seventeenth embodiment of the present invention.

FIG. 25 is a block diagram illustrating the configuration of the step-size generator 101. The configuration of FIG. 25 differs from that of FIG. 15 in that the step-size generator 161 is used instead of the step-size generator 160. The operation will be chiefly described here in connection with the difference.

Unlike the step-size generator 160, the step-size generator 161 of FIG. 25 does not receive $R_j$ from the coefficient value evaluator 130 and information regarding active taps from the memory 114. Instead, the step-size generator 161 sets the step size, to be sent to the output terminal $901_l$ to zero only when the input signal evaluator 174 sends the coefficient update skip signal. Otherwise, the step-size generator 161 outputs a predetermined value to the output terminal 901 as the step size common to the coefficient generators $30_l$ to $30_L$.

Figure 26:
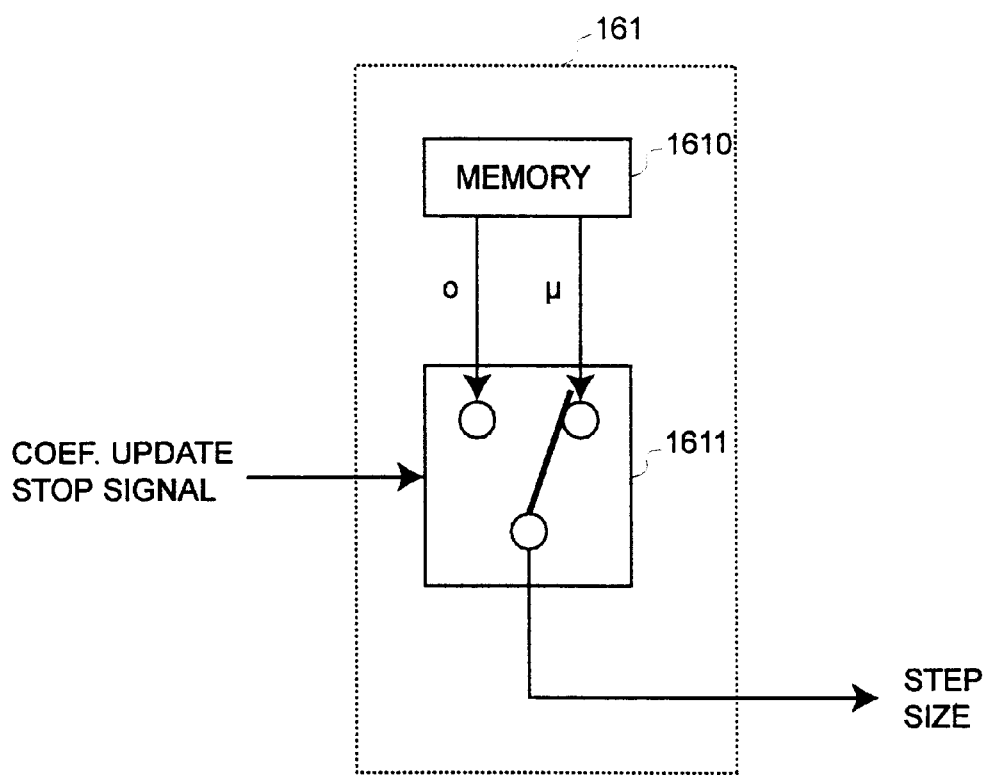
FIG. 26 is a block diagram illustrating the configuration of the step-size generator in the tap controller according to the seventeenth embodiment of the present invention.

FIG. 26 is a block diagram illustrating the configuration of the step-size generator 161. The step-size generator 161 consists of the memory 1610 and the switch 1611. The memory 1610 stores zero and $\mu$ as a step size in normal states and supplies them to two terminals of the switch 1611. The switch 1611 is controlled by the coefficient update skip signal from the input signal evaluator 174. Normally, the switch 1611 selectively output or $\mu$ sent from the memory 1610 as the step size. When the input signal evaluator 174 outputs the coefficient update skip signal, the switch 1611 selectively outputs zero.

As clearly understood from the above description, the input signal evaluator 174 in the tap controller 101 that creates a coefficient update skip signal can be replaced by the input signal evaluator 170, 171, 172 or 173. The step-size generator 161 can be used instead of the step-size generator 160 in any one of the tap controllers 91, 92, 93, 94, 95, 96, 97, 98, 99 and 100.

In the above embodiments according to the invention, the LMS algorithm has been assumed for coefficient adaptation. However, other algorithms may be used in the present invention. For instance, the eighteenth embodiment can be implemented by using the normalized LMS (NLMS) algorithm disclosed in the reference 2 in the fourth embodiment.

Figure 27:
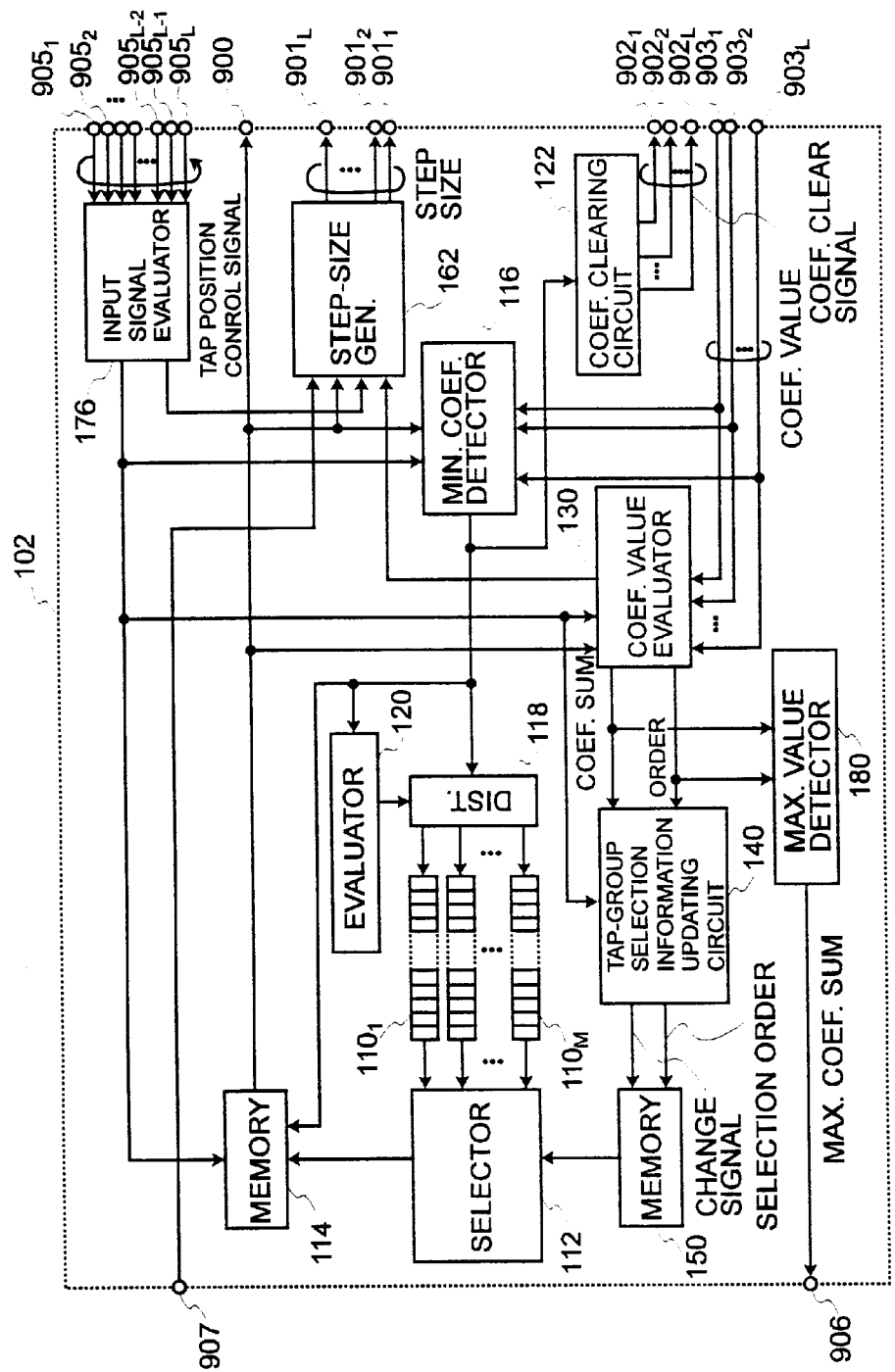
FIG. 27 is a block diagram illustrating the configuration of the tap controller in the adaptive filter according to the eighteenth embodiment of the present invention.

The eighteenth embodiment can be obtained by substituting the tap controller 102 for the tap controller 92 in the eighth embodiment shown in FIG. 14. This embodiment differs from the eighth embodiment in the tap controller 102. Hence, the tap controller 102 will be described here by referring to FIG. 27. FIG. 27 is a block diagram illustrating the configuration of the tap controller 102. The configuration of FIG. 27 differs from that of FIG. 14 in the step size generator 162 and the input signal evaluator 176. The operation of the embodiment will be chiefly described below in connection with the difference.

The tap controller 102 differs from the tap controller 92 in that the input signal evaluator 176 supplies the input signal power at active taps to the step-size generator 162. The filter coefficient adaptation by the NLMS algorithm is given by:

$$c_i(k+1) = c_i(k) + \mu_i \frac{e(k)x(k-a(i))}{\sum_{i=1}^{L} x^2(k-a(i))} \quad (17)$$

where a(i) is a set of active tap numbers and L is its size as explained in connection with the equation (15).

In comparison with equation (15) representing the LMS algorithm, the equation (17) normalizes the second term of the right-hand side with:

$$\sum_{i=1}^{L} x^2(k-a(i))$$

The input signal evaluator 176 computes the input signal power at active taps and then transmits it to the step-size generator 162. The tap controller 102 differs from the tap controller 92 in that the step-size generator 162 is substituted for the step-size generator 160 and that the input signal evaluator 176 is substituted for the input signal evaluator 174. There is no difference in operation between the tap controllers 102 and 92. Hence, the duplicate description will be omitted here.

Figure 28:
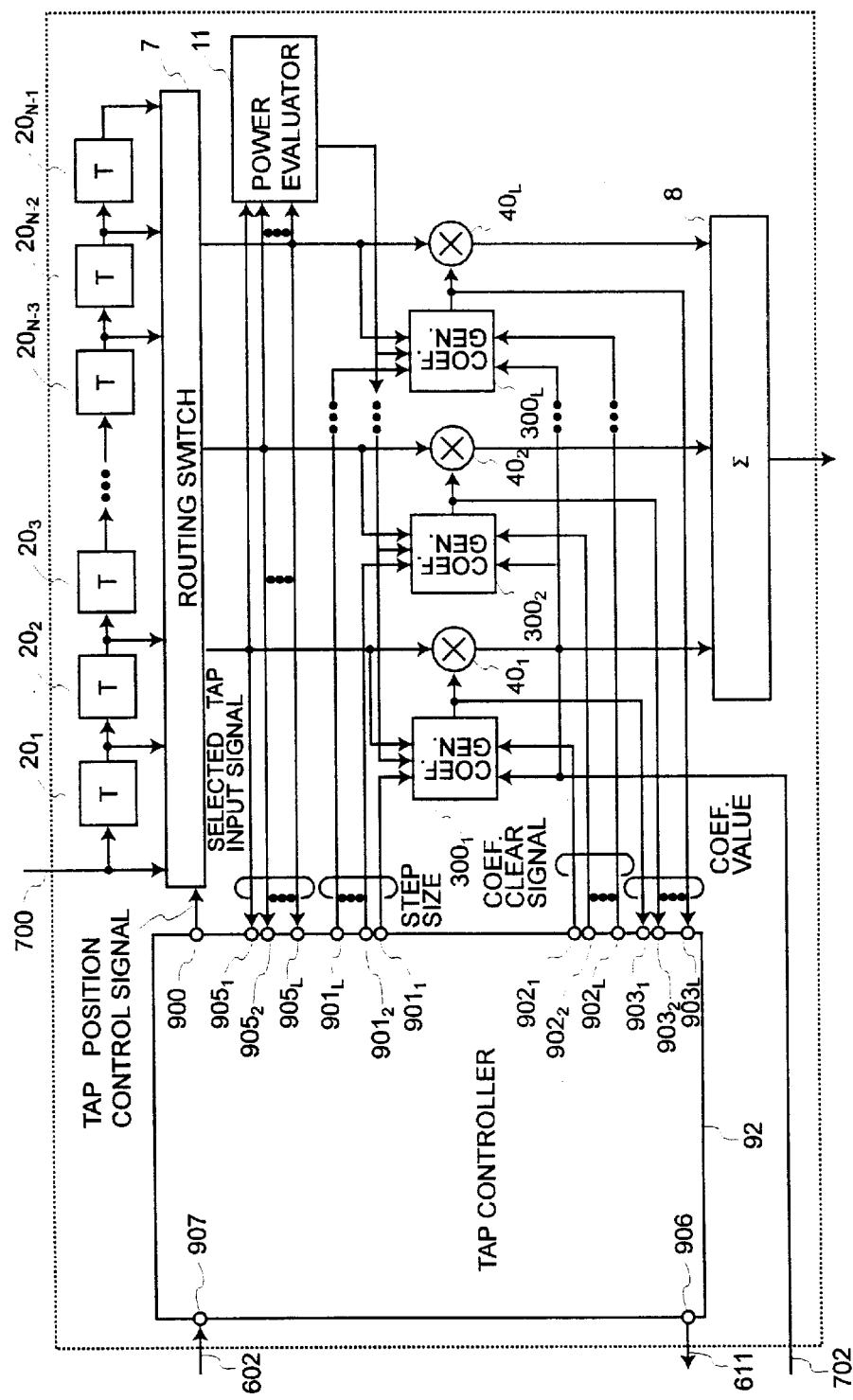
FIG. 28 is a block diagram illustrating the configuration of the adaptive filter according to the nineteenth embodiment of the present invention.

In the eighth embodiment, the NLMS algorithm may be substituted for the LMS algorithm without changing the tap controller 92. This will be described as the nineteenth embodiment. FIG. 28 is a block diagram illustrating the adaptive filter according to the nineteenth embodiment of the invention. The nineteenth embodiment differs from the eighth embodiment in that the coefficient generators $300_l$ to $300_L$ are used instead of the coefficient generators $30_l$ to $30_L$ and that the power evaluator 11 is newly added.

The power evaluator 11 receives input signal samples to active taps as the input terminals $905_l$ to $905_L$. The power evaluator 11 performs the calculation of the following term:

$$\sum_{i=1}^{L} x^2(k-a(i))$$

The inverse of the computed result is supplied as a normalization factor to the coefficient generators $300_i$ to $300_L$.

Figure 29:
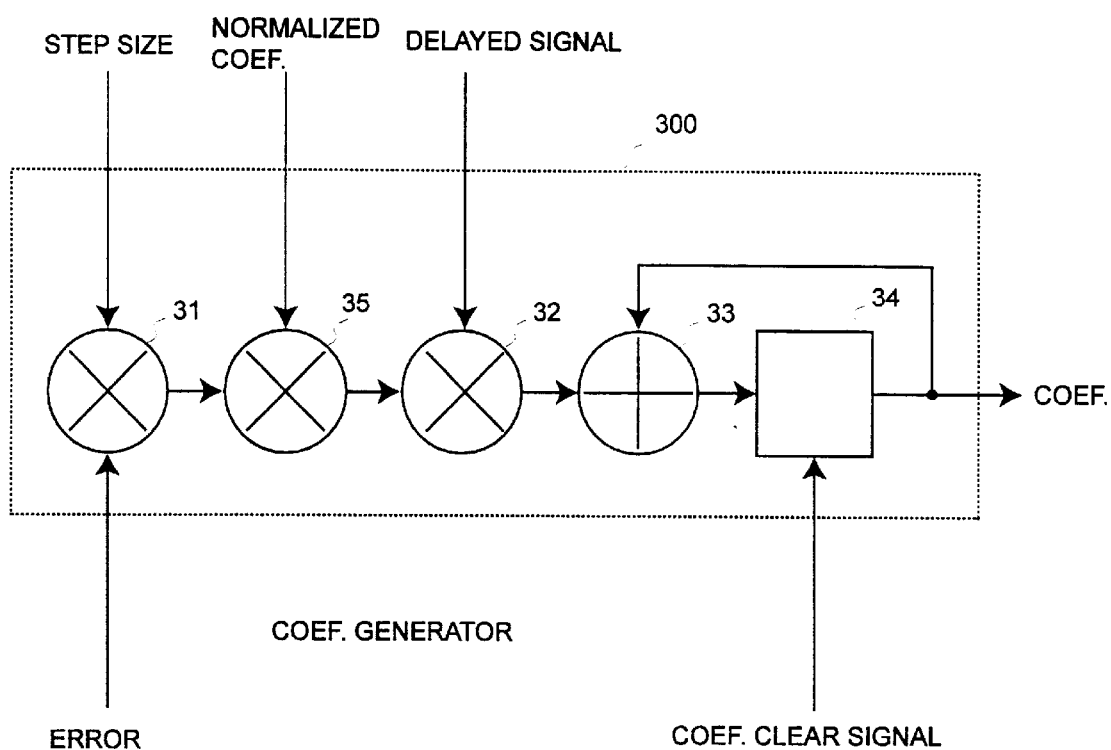
FIG. 29 is a block diagram illustrating the configuration of the coefficient generator in the adaptive filter according to the nineteenth embodiment of the present invention.

FIG. 29 is a block diagram illustrating the configuration of the coefficient generator $300_i$ (i=1, 2, . . . , L). The coefficient generator $300_i$ differs from the coefficient generator $30_i$ (i=1, 2, . . . , L) in that the multiplier 35 multiplies the output signal of the multiplier 31 by the normalization factor and then sends the product to the multiplier 32. Unlike the output of the multiplier 32 of FIG. 7, the coefficient correction amount, or the output of the multiplier 32, in FIG. 28 becomes:

$$\frac{1}{\sum_{i=1}^{L} x^2(k-a(i))}$$

of that in FIG. 7. Thus, the coefficient update equation expressed by the equation (17) can be complemented. Other configurations and operations of the coefficient generator $300_i$ are similar to those of the coefficient generator $30_i$. Hence, the duplicate description will be omitted here.

Figure 30:
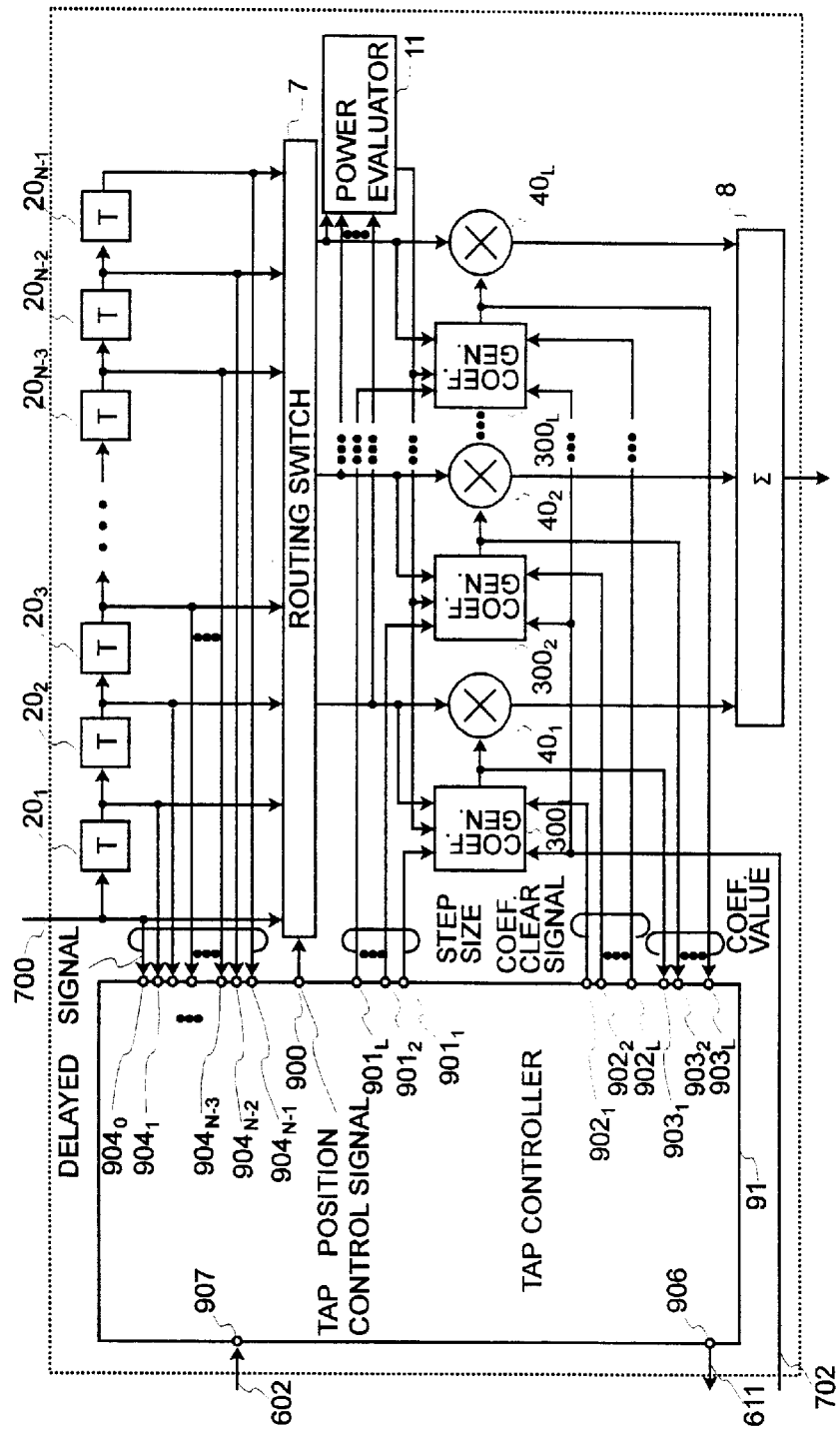
FIG. 30 is a block diagram illustrating the configuration of the adaptive filter according to the twentieth embodiment of the present invention.

The twentieth embodiment can be obtained by using the NLMS algorithm in the fourth embodiment (FIG. 6), instead of the LMS algorithm. FIG. 30 is a block diagram illustrating the adaptive filter according to the twentieth embodiment of the present invention. The twentieth embodiment differs from the fourth embodiment in that the coefficient generators $300_1$ to $300_L$ are used instead of the coefficient generators $30_1$ to $30_L$ and that the power evaluator 11 is newly added. The difference between the fourth embodiment and the twentieth embodiment corresponds to the difference between the eighth embodiment and the nineteenth embodiment. Hence, the duplicate description will be omitted here.

It has been shown that the coefficient update algorithm can be changed in the fourth and eighth embodiments. However, it is apparent that a similar change may be made in the fifth through seventh embodiments and the ninth through eighteenth embodiments. Like the seventeenth embodiment of the invention, the eighteenth, nineteenth or twentieth embodiment may have the configuration that produces the same step size to all tap groups. In addition, the sequential regression algorithm (SRA) described in the reference 1 and the RLS algorithm described in the reference 2 can be used as the algorithm for adaptive filters. However, the specific configuration will be not described here.

In the fourth through twentieth embodiments, it has been assumed that the number of coefficients to be rearranged as a single tap position control is 1. However, the number of coefficients may be greater than 1. Until now, the echo cancellers have been described in detail according to the foregoing embodiments. However, under the same principle, the present invention is applicable to noise cancellers, howling cancellers, adaptive equalizers, and the like.

According to the present invention, by considering the characteristics of signals input to multiplexed transmission lines, the coefficient adaptation of the adaptive filter whose convergence is advanced is selectively skipped. Hence, even when the number of multiplexed transmission lines is increased, computational operations required do not increase in proportion to the number of the lines.

The entire disclosure of Japanese Application No. 10-374831 filed on Dec. 28, 1998 including specification, claims, drawing and summary are incorporated herein by reference in its entirety.

What is claimed is:

1. An echo canceling method, wherein adaptive filters respectively installed in transmission lines remove echoes occurring in a multiplexed line, comprising the steps of:

updating the coefficients of each adaptive filter in each line based on a correlation between an error signal and a transmitted signal, said error signal being obtained by subtracting an echo replica from a mixed signal including an echo and a received signal;

comparing convergence degrees of said adaptive filters respectively installed in said lines to obtain comparison results; and suppressing coefficient adaptation of a particular adaptive filter whose convergence is leading with respect to others of said adaptive filters.

2. The method defined in claim 1, wherein said step of comparing convergence degrees of said adaptive filters comprises the steps of:

averaging convergence degrees of said adaptive filters; and comparing averaged convergence degrees among said adaptive filters.

3. The method defined in claim 1, wherein said step of updating the coefficients of each adaptive filter comprises the step of updating coefficients using a step size controlled according to the convergence degree.

4. The method defined in claim 3, wherein said step of comparing convergence degrees of said adaptive filters comprises the step of comparing the convergence degree of each of said adaptive filters according to said step size supplied from each adaptive filter.

5. The method defined in claim 1, wherein said step of updating the coefficients of each adaptive filter comprises the step of adaptively controlling its tap positions so as to locate tap coefficients in the dispersive regions which can be obtained by removing fixed delays from the impulse response in an echo path.

6. The method defined in claim 5, wherein said step of comparing convergence degrees of said adaptive filters comprises the step of comparing the convergence degree of each of said adaptive filters according to information supplied from each adaptive filter regarding positions where said taps are located.

7. The method defined in claim 1, wherein said step of updating the coefficients of each adaptive filter comprises the steps of:

storing as active tap numbers a part of tap numbers whose coefficients are used for producing the output of said adaptive filters;

allocating coefficients only at active taps;

storing as inactive tap numbers the tap numbers not used for said output, in a queue;

updating coefficients corresponding to said active tap numbers;

defining tap numbers with absolute coefficients below a threshold at said active tap as inactive tap numbers;

storing said inactive tap numbers at the end of said queue; and extracting inactive tap numbers at the top of said queue as new active tap numbers.

8. An echo canceling apparatus suitable for multiplexed transmission lines, comprising:

a plurality of adaptive filters respectively installed in a plurality of transmission lines; and a controller which compares a set of information regarding convergence degrees from said plurality of adaptive filters to obtain comparison results and then creates coefficient update control signals to suppress updating coefficients in a particular one of said plurality of adaptive filters based on said comparison results.

9. The apparatus defined in claim 8, wherein said controller comprises:

an average circuit which averages a set of information regarding convergence of said adaptive filters.

10. The apparatus defined in claim 8, wherein each of said adaptive filters comprises:

a step-size controller which controls the step size according to convergence degrees.

11. The apparatus defined in claim 8, wherein said controller creates said coefficient update control signals based on comparison results, in response to step sizes of said adaptive filters.

12. The apparatus defined in claim 8, wherein each of said adaptive filters comprises a tap controller that adaptively controls its tap positions so as to locate tap coefficients in dispersive regions by removing fixed delays from the impulse response in an echo path.

13. The apparatus defined in claim 12, wherein said controller further receives a set of information regarding tap positions and then creates said coefficient update control signal based on results obtained by comparing said set of information.

14. The apparatus defined in claim 8, wherein each of said adaptive filters comprises:
- a plurality of delay elements connected in cascade, which delay an input signal;
- a routing switch which selectively outputs apart of delayed signals being output from said plurality of delay elements;
- a plurality of coefficient generators which generate tap coefficients corresponding to the delayed signals from said routing switch;
- a plurality of multipliers which multiply each of said coefficients, or the outputs of said coefficient generators, by the output signals from said routing switch; and
- an adder which calculates the sum of the outputs from said plurality of multipliers and outputs the sum to adaptive filters; and
- a tap controller which generates a tap position control signal to control said routing switch, in response to said input signals, said outputs from said plurality of delay elements and coefficients from said coefficient generators, and generates a coefficient clear signal and step sizes to said plurality of coefficient generators and sets said step sizes to zero in response to said coefficient update control signal from said controller.

15. The echo canceling apparatus as recited in claim 8, wherein said controller suppresses the updating coefficient of a particular adaptive filter whose convergence is leading with respect to others of said adaptive filters.

* * * * *